US012759860B2

(12) United States Patent
Pucker et al.

(10) Patent No.: US 12,759,860 B2
(45) Date of Patent: Oct. 13, 2026

(54) PRE-WARMED POTABLE WATER SYSTEM AND METHOD FOR AIRCRAFT GALLEY APPLIANCE WATER HEATER

(71) Applicant: The Boeing Company, Arlington, VA (US)

(72) Inventors: Andrew L. Pucker, Huntington Beach, CA (US); Thomas Joseph Moran, Lake Stevens, WA (US); Sami Movsesian, Glendale, CA (US)

(73) Assignee: THE BOEING COMPANY, Arlington, VA (US)

( * ) Notice: Subject to any disclaimer, the term of this patent is extended or adjusted under 35 U.S.C. 154(b) by 36 days.

(21) Appl. No.: 18/820,739

(22) Filed: Aug. 30, 2024

(65) Prior Publication Data

US 2026/0062279 A1 Mar. 5, 2026

(51) Int. Cl.
*B67D 1/08* (2006.01)
*B64D 47/00* (2006.01)

(52) U.S. Cl.
CPC ........... *B67D 1/0895* (2013.01); *B64D 47/00* (2013.01)

(58) Field of Classification Search
CPC .............................. B64D 47/00; B67D 1/0895
See application file for complete search history.

(56) References Cited

U.S. PATENT DOCUMENTS

| | | | | |
|---|---|---|---|---|
| 10,488,075 | B2 | 11/2019 | Burd | |
| 2005/0210910 | A1 | 9/2005 | Rigney et al. | |
| 2008/0087039 | A1 * | 4/2008 | Reed | B64D 13/06 62/498 |
| 2015/0007600 | A1 | 1/2015 | Godecker et al. | |
| 2015/0089970 | A1 | 4/2015 | Lu et al. | |
| 2016/0007736 | A1 | 1/2016 | Burd | |
| 2025/0121942 | A1 | 4/2025 | Pucker et al. | |

FOREIGN PATENT DOCUMENTS

| | | | |
|---|---|---|---|
| CA | 2914818 | A1 | 12/2014 |
| DE | 102005063407 | B4 | 4/2013 |
| WO | 2008008324 | A2 | 1/2008 |

OTHER PUBLICATIONS

EP Search Report mailed May 28, 2025 in re EP Application No. 25154204.9.
EP Search Report mailed Jun. 25, 2025 in re EP Application No. 25154203.1.

* cited by examiner

*Primary Examiner* — Elizabeth J Martin
(74) *Attorney, Agent, or Firm* — COATS & BENNETT, PLLC

(57) ABSTRACT

Systems and methods for establishing a warmed potable water flow from an aircraft potable water supply with an ambient temperature absorbs and scavenges waste heat at a heat exchanger to pre-warm a potable water flow delivered to an aircraft galley appliance water heater, and to increase appliance water heating efficiency and to conserve electrical power for aircraft galley appliance water heater operation are disclosed.

20 Claims, 25 Drawing Sheets

PRE-WARMED POTABLE WATER SYSTEM AND METHOD FOR AIRCRAFT GALLEY APPLIANCE WATER HEATER

TECHNOLOGICAL FIELD

The present disclosure relates, generally, to the field of aircraft galley water-heating appliances. More specifically, the present disclosure relates to the field of conserving energy in achieving temperatures used to prepare hot beverages and hot food in an aircraft.

BACKGROUND

Aircraft galley hot beverage and food appliances typically employ electrical heating elements that can convert electrical energy to heat for the purpose of heating an integrated appliance water supply to a hot temperature. Such electrical heating elements can impose a considerable energy drain on aircraft power supplies. In addition, typical hot beverage preparation times on aircraft are typically governed by an appliance heating element capability, at least with respect to the time required to heat a particular useful volume of water from an initial water temperature to a useful water temperature for the preparation and dispensing of aircraft onboard hot beverage and food selections within an aircraft galley.

Unless explicitly identified as such, no statement herein is admitted as prior art merely by its inclusion in the Technological Field and/or Background section.

SUMMARY

The present disclosure is directed to systems and methods for repurposing, redirecting, conserving, and/or harvesting waste heat generated within an aircraft to pre-heat a potable water flow from a potable water supply to increase the efficiency of aircraft galley appliance water heaters and concurrently increase the efficiency of air chilling circuits while significantly and concurrently decreasing the electrical energy drain (e.g., electrical energy consumption) typically observed to concurrently achieve aircraft galley appliance water-heating and air chilling functions in an onboard aircraft environment.

According to a present aspect, an onboard aircraft system for pre-warming a potable water flow to an aircraft galley water heating appliance using repurposed waste heat produced in an aircraft air chilling circuit is disclosed. In one present aspect, an onboard aircraft system comprises a potable water pathway comprising a potable water supply comprising a volume of potable water in a potable water supply vessel, with the potable water supply comprising a potable water supply initial temperature. The system further comprises a chilled air circuit, with the chilled air circuit comprising an air chiller, and with the air chiller comprising an air chiller condenser that comprises an air chiller condenser air intake and an air chiller condenser warmed air exhaust. The system further comprises a heat exchanger positioned proximate to the air chiller condenser warmed air exhaust, with the heat exchanger in communication with the potable water pathway, with the heat exchanger further in communication with the chilled air circuit, and with the heat exchanger configured to form a pre-warmed potable water flow. The heat exchanger comprises a heat exchanger potable water flow intake, a heat exchanger potable water flow outlet, and a heat exchanger warmed air inlet and a heat exchanger air outlet, with the heat exchanger warmed air inlet positioned to receive a warmed air flow from the air chiller condenser warmed air exhaust. The system further comprises a pre-warmed potable water flow line in direct communication with the heat exchanger potable water flow outlet and an aircraft galley appliance comprising an aircraft galley appliance water heater, with the aircraft galley appliance water heater in communication with the pre-warmed potable water flow line, with the aircraft galley appliance water heater configured to further heat a pre-warmed potable water flow in the potable water pathway delivered to the aircraft galley appliance water heater. The system further comprises a pre-warmed potable water storage vessel in communication with the pre-warmed potable water flow line, with the pre-warmed potable water storage vessel further in communication with the aircraft galley appliance water heater.

In another aspect, the initial aircraft potable water supply temperature ranges from about 35° F. to about 77° F.

In another aspect, the pre-warmed potable water flow comprises a pre-warmed potable water flow temperature ranging from about 110° F. to about 165° F.

In another aspect, the aircraft galley appliance is at least one of an aircraft galley coffee maker, an aircraft galley water boiler, and an aircraft galley steam oven.

In another aspect, in operation, the potable water circuit is a potable water closed circuit, said potable water closed circuit further comprising a valve, with the valve positioned between the aircraft potable water supply and the potable water circuit, and wherein the valve is configured to move from an open position configured to release potable water from the potable water supply into the potable water circuit to a closed position configured to restrict re-entry of the potable water flow circuit back into the potable water supply.

In another present aspect, in operation, the potable water circuit is a potable water open circuit in communication with a continuous potable water flow directed from the aircraft potable water supply into the potable water circuit, and wherein a volume of the pre-warmed potable water flow downstream of at least one of the aircraft galley appliance and the pre-warmed potable water storage vessel is permitted to reenter the aircraft potable water supply.

In another present aspect, in operation, the pre-warmed potable water flow is configured to exit the heat exchanger potable water flow outlet at a pre-warmed potable water flow temperature ranging from about 110° F. to about 165° F.

In another present aspect, in operation, the pre-warmed potable water flow is configured to exit the heat exchanger potable water flow outlet at a pre-warmed potable water flow temperature ranging from about 128° F. to about 166° F.

In another present aspect the aircraft galley appliance is at least one of an aircraft galley coffee maker, an aircraft galley water boiler, and an aircraft galley steam oven.

In a further present aspect, the system further comprises a second heat exchanger, with the second heat exchanger positioned proximate to and upstream from the air chiller condenser intake.

In another present aspect, the chilled air circuit is in communication with the potable water pathway.

In another present aspect, the potable water pathway is at least in communication with the chilled air circuit at the heat exchanger, with the potable water pathway configured to augment cooling air in the chilled air circuit.

In another present aspect, a portion of the pre-warmed potable water flow exiting the heat exchanger is in communication with a pre-warmed potable water storage vessel via the pre-warmed potable water flow line.

In another present aspect, pre-warmed potable water storage vessel is in communication with the aircraft galley appliance water heater.

In another present aspect, the pre-warmed potable water storage vessel is in communication with the potable water supply via the pre-warmed potable water flow line, with the pre-warmed potable water flow line configured to direct a volume of pre-warmed potable water flow from the pre-warmed potable water storage vessel to the potable water supply.

In another present aspect, the potable water pathway is at least in communication with the chilled air circuit at the second heat exchanger, with the potable water pathway configured to augment cooling air in the chilled air circuit.

Another present aspect is directed to an aircraft comprising an onboard aircraft system for pre-warming a potable water flow to an aircraft galley water heating appliance using repurposed waste heat produced in an aircraft air chilling circuit is disclosed. In one present aspect, an onboard aircraft system comprises a potable water pathway comprising a potable water supply comprising a volume of potable water in a potable water supply vessel, with the potable water supply comprising a potable water supply initial temperature. The system further comprises a chilled air circuit, with the chilled air circuit comprising an air chiller, and with the air chiller comprising an air chiller condenser that comprises an air chiller condenser air intake and an air chiller condenser warmed air exhaust. The system further comprises a heat exchanger positioned proximate to the air chiller condenser warmed air exhaust, with the heat exchanger in communication with the potable water pathway, with the heat exchanger further in communication with the chilled air circuit, and with the heat exchanger configured to form a pre-warmed potable water flow. The heat exchanger comprises a heat exchanger potable water flow intake, a heat exchanger potable water flow outlet, and a heat exchanger warmed air inlet and a heat exchanger air outlet, with the heat exchanger warmed air inlet positioned to receive a warmed air flow from the air chiller condenser warmed air exhaust. The system further comprises a pre-warmed potable water flow line in direct communication with the heat exchanger potable water flow outlet, and an aircraft galley appliance comprising an aircraft galley appliance water heater, with the aircraft galley appliance water heater in communication with the pre-warmed potable water flow line, with the aircraft galley appliance water heater configured to further heat a pre-warmed potable water flow in the potable water pathway delivered to the aircraft galley appliance water heater. The system further comprises a pre-warmed potable water storage vessel in communication with the pre-warmed potable water flow line, with the pre-warmed potable water storage vessel further in communication with the aircraft galley appliance water heater.

Another present aspect is directed to a method for decreasing electrical energy demand in an operating aircraft galley appliance water heater and concurrently decreasing electrical energy demand in an operating air chiller, with the method comprising directing a potable water flow from a potable water supply into a potable water circuit. The method further comprises directing the potable water flow into a heat exchanger potable water inlet of a heat exchanger, with the heat exchanger positioned proximate to and downstream from an air chiller condenser, with the heat exchanger comprising a heat exchanger warmed air intake and a heat exchanger air outlet, and with the heat exchanger further comprising a heat exchanger pre-warmed potable water flow outlet. The method further comprises directing a warmed airflow from an air chiller condenser exhaust into the heat exchanger warmed air intake, with the warmed airflow having a warmed air temperature higher that the initial potable water flow temperature, and forming a pre-warmed potable water flow at the heat exchanger, with the pre-warmed potable water flow comprising a pre-warmed potable water flow temperature higher than the initial potable water flow temperature. The method further comprises directing the pre-warmed potable water flow to the aircraft galley appliance water heater.

In another present aspect, in the method for decreasing electrical energy demand in an operating aircraft galley appliance water heater, the method further includes concurrently decreasing electrical energy demand in an operating air chiller.

In another present aspect, the potable water flow has an initial potable water flow temperature ranging from about 35° F. to about 77° F.

In a further present aspect, pre-warmed potable water flow at the heat exchanger has a temperature ranging from about 110° F. to about 165° F.

In a further present aspect, pre-warmed potable water flow at the heat exchanger has a temperature ranging from about 128° F. to about 166° F.

In another present aspect, the method further comprises directing a portion of the pre-warmed potable water flow to a pre-warmed potable water storage vessel.

In another present aspect, the method further comprises directing a portion of the pre-warmed potable water flow from the pre-warmed potable water storage vessel to the aircraft galley appliance water heater.

In another present aspect, the method further comprises directing a portion of the pre-warmed potable water flow into the potable water supply from the pre-warmed potable water storage vessel with the potable water pathway configured to be a potable water open circuit.

In another present aspect the aircraft galley appliance is at least one of an aircraft galley coffee maker, an aircraft galley water boiler, and an aircraft galley steam oven.

According to another present aspect, a method for decreasing electrical energy demand in an operating aircraft galley appliance water heater is disclosed, with the method comprising directing a potable water flow having an initial potable water flow temperature into a potable water circuit from a potable water supply to a first heat exchanger potable water inlet of a first heat exchanger, with the first heat exchanger positioned proximate to and upstream from an air chiller condenser. The first heat exchanger further comprises a first heat exchanger air intake, a first heat exchanger air outlet, and a first heat exchanger potable water flow outlet. The method further comprises forming a pre-warmed potable water flow in the first heat exchanger, with the pre-warmed potable water flow having a pre-warmed potable water flow temperature and directing the pre-warmed potable water flow from the first heat exchanger potable water flow outlet to a second heat exchanger potable water inlet of a second heat exchanger, with the second heat exchanger positioned proximate to the air chiller, with the second heat exchanger further positioned to receive warmed air from an air chiller condenser exhaust. The second heat exchanger further comprises a second heat exchanger warmed air intake and a second heat exchanger air outlet, with the second heat exchanger further comprising a second heat exchanger potable water flow outlet. The method further comprises directing a warmed airflow from an air chiller condenser exhaust into the second heat exchanger warmed air intake, with the warmed airflow having a warmed air temperature higher that the pre-warmed potable water flow temperature and forming a further pre-warmed potable water flow at the second heat exchanger, with the further pre-warmed potable water flow comprising a further pre-warmed potable water flow temperature higher than the pre-warmed potable water flow temperature, and directing the further pre-warmed potable water flow to the aircraft galley appliance water heater.

In another present aspect, in the method for decreasing electrical energy demand in an operating aircraft galley appliance water heater, the method further includes concurrently decreasing electrical energy demand in an operating air chiller.

In another present aspect, the potable water flow has an initial potable water flow temperature ranging from about 35° F. to about 77° F.

In a further present aspect, the pre-warmed potable water flow at the heat exchanger has a temperature ranging from about 110° F. to about 165° F.

In another present aspect, in operation, the pre-warmed potable water flow is configured to exit the heat exchanger potable water flow outlet at a pre-warmed potable water flow temperature ranging from about 128° F. to about 166° F.

In another present aspect, the method further includes directing a portion of the further pre-warmed potable water flow to a further pre-warmed potable water storage vessel.

In another present aspect, the method further includes directing a portion of the further pre-warmed potable water flow from the further pre-warmed potable water storage vessel to the aircraft galley appliance water heater.

In another present aspect, the method further includes directing a portion of the further pre-warmed potable water flow into the potable water supply vessel, said potable water circuit configured to be a potable water open circuit.

Another present aspect is directed to an onboard aircraft system for pre-warming a potable water flow to an aircraft galley water heating appliance and concurrently increasing efficiency of an aircraft air chilling system using warmed water and cooled air from a heat exchanger, with the on board aircraft system comprising a potable water pathway comprising a potable water supply comprising a volume of potable water in a potable water supply vessel, and with the potable water supply comprising a potable water supply initial temperature ranging from about 35° F. to about 77° F. The on board aircraft system further comprises a potable water flow line in communication with the potable water supply, and a chilled air circuit, with the chilled air circuit comprising an air chiller unit. The air chiller unit comprises an air chiller condenser, with the air chiller condenser comprising an air chiller condenser intake. The system further includes a heat exchanger positioned proximate to the air chiller condenser intake, with the heat exchanger in communication with the potable water flow line, and with the heat exchanger further in communication with the chilled air circuit. The heat exchanger comprises a heat exchanger potable water flow intake, a heat exchanger warmed potable water flow outlet, a heat exchanger ambient air inlet, and a heat exchanger cooled air outlet, with the heat exchanger cooled air outlet positioned to deliver a cooled air flow from the heat exchanger to the air chiller condenser air intake, and with the heat exchanger further configured to form a pre-warmed potable water flow. The system further includes a pre-warmed potable water flow line in direct communication with the heat exchanger potable water flow outlet and an aircraft galley appliance comprising an aircraft galley appliance water heater, with the aircraft galley appliance water heater in communication with the pre-warmed potable water flow line, and with the aircraft galley appliance water heater configured to further heat the pre-warmed potable water flow delivered to the aircraft galley appliance water heater via the pre-warmed potable water flow line. The system further comprise a pre-warmed potable water storage vessel in communication with the pre-warmed potable water flow line, with the pre-warmed potable water storage vessel further in communication with the aircraft galley appliance water heater.

In another present aspect, the pre-warmed potable water flow comprising a pre-warmed potable water flow temperature ranges from about 110° F. to about 165° F.

In another present aspect, in operation, the pre-warmed potable water flow is configured to exit the heat exchanger potable water flow outlet at a pre-warmed potable water flow temperature ranging from about 128° F. to about 166° F.

In another present aspect the aircraft galley appliance is at least one of an aircraft galley coffee maker, an aircraft galley water boiler, and an aircraft galley steam oven.

In another present aspect, in operation, the potable water circuit comprises a potable water closed circuit, with the potable water closed circuit further comprising a valve, with the valve positioned between the aircraft potable water supply and the potable water circuit, and wherein the valve is configured to move from an open position configured to release potable water from the potable water supply into the potable water circuit to a closed position configured to restrict re-entry of the potable water flow circuit back into the potable water supply and back into the potable water supply vessel.

In another present aspect, in operation, the onboard aircraft system comprises a potable water open circuit in communication with a potable water flow directed from the aircraft potable water supply into the potable water circuit, and wherein a volume of the pre-warmed potable water flow downstream of at least one of the aircraft galley appliance and the pre-warmed potable water storage vessel is permitted to reenter the aircraft potable water supply.

In another present aspect, in operation, the pre-warmed potable water flow is configured to exit the heat exchanger potable water flow outlet at a pre-warmed potable water flow temperature ranging from about 60° F. to about 80° F.

In another present aspect, the chilled air circuit is in communication with the potable water pathway.

In a further present aspect, the potable water pathway is at least in communication with the chilled air circuit at the heat exchanger, with the potable water pathway configured to augment cooling in the chilled air circuit.

In another present aspect, the pre-warmed potable water storage vessel is in communication with the potable water supply via the pre-warmed potable water flow line, with the pre-warmed potable water flow line configured to direct a volume of pre-warmed potable water flow from the pre-warmed potable water storage vessel to the potable water supply in the potable water storage vessel.

Another present aspect is directed to an aircraft comprising the onboard aircraft system for pre-warming a potable water flow to an aircraft galley water heating appliance and concurrently increasing efficiency of an aircraft air chilling system [using warmed water and chilled air from a heat exchanger], with the on board aircraft system comprising a potable water pathway comprising a potable water supply comprising a volume of potable water in a potable water supply vessel, and with the potable water supply comprising a potable water supply initial temperature ranging from about 35° F. to about 77° F. The on board aircraft system further comprises a potable water flow line in communication with the potable water supply, and a chilled air circuit, with the chilled air circuit comprising an air chiller unit. The air chiller unit comprises an air chiller condenser, with the air chiller condenser comprising an air chiller condenser intake. The system further includes a heat exchanger positioned proximate to the air chiller condenser intake, with the heat exchanger in communication with the potable water flow line, and with the heat exchanger further in communication with the chilled air circuit. The heat exchanger comprises a heat exchanger potable water flow intake, a heat exchanger warmed potable water flow outlet, a heat exchanger ambient air inlet, and a heat exchanger cooled air outlet, with the heat exchanger cooled air outlet positioned to deliver a cooled air flow from the heat exchanger to the air chiller condenser air intake, and with the heat exchanger further configured to form a pre-warmed potable water flow. The system further includes a pre-warmed potable water flow line in direct communication with the heat exchanger potable water flow outlet and an aircraft galley appliance comprising an aircraft galley appliance water heater, with the aircraft galley appliance water heater in communication with the pre-warmed potable water flow line, and with the aircraft galley appliance water heater configured to further heat the pre-warmed potable water flow delivered to the aircraft galley appliance water heater via the pre-warmed potable water flow line. The system further comprise a pre-warmed potable water storage vessel in communication with the pre-warmed potable water flow line, with the pre-warmed potable water storage vessel further in communication with the aircraft galley appliance water heater.

Another present aspect is directed to a method for decreasing electrical energy demand in an operating aircraft galley appliance water heater and concurrently decreasing electrical energy demand in an operating aircraft air chiller. The method comprises directing a potable water flow from a potable water supply into a potable water pathway, with the potable water flow having an initial potable water flow temperature ranging from about 35° F. to about 77° F., and directing the potable water flow into a heat exchanger potable water inlet of a heat exchanger, with the heat exchanger positioned proximate to an air chiller condenser inlet side of the air chiller unit, and with the heat exchanger comprising a heat exchanger warmer air inlet and a heat exchanger cooler air outlet, and with the heat exchanger further comprising a heat exchanger potable water flow inlet and a heat exchanger pre-warmed potable water flow outlet. The method further comprises directing an ambient airflow into the heat exchanger warmer air inlet, with the ambient airflow having a temperature greater than the initial potable water flow temperature, and directing a cooler airflow from the heat exchanger cooler air outlet to the air chiller condenser intake, and with the cooler airflow having a temperature lower than the ambient airflow temperature. The method further comprises forming a pre-warmed potable water flow at the heat exchanger, with the pre-warmed potable water flow comprising a pre-warmed potable water flow temperature higher than the initial potable water flow temperature, and directing the pre-warmed potable water flow from the heat exchanger pre-warmed potable water flow outlet to the aircraft galley appliance water heater via a pre-warmed potable water flow line.

In another present aspect, the method further comprises directing a portion of the pre-warmed potable water flow to a pre-warmed potable water storage vessel.

In another present aspect, the method further comprises directing a portion of the pre-warmed potable water flow from the pre-warmed potable water storage vessel to the aircraft galley appliance water heater.

In another present aspect, the method further comprises directing a portion of the pre-warmed potable water flow from at least one of the pre-warmed potable water storage vessel and the pre-warmed potable water flow line back into the potable water supply, said potable water pathway configured to be a potable water open circuit.

In another present aspect, the potable water pathway is in communication with the chilled air circuit, said potable water circuit configured to augment cooling in the chilled air circuit.

In a further present aspect, in operation, the potable water pathway comprises a potable water closed circuit.

In another present aspect, in operation, the potable water pathway comprises a potable water open circuit, with the potable water open circuit configured to remain in open communication with the aircraft potable water supply.

In another present aspect, the potable water supply maintains an average the potable water supply temperature ranging from about 35° F. to about 77° F. and the potable warmed water flow leaving the heat exchanger in the potable water pathway comprises an average potable warmed water flow temperature ranging from about 110° F. to about 165° F.

In another present aspect, in operation, the pre-warmed potable water flow is configured to exit the heat exchanger potable water flow outlet at a pre-warmed potable water flow temperature ranging from about 128° F. to about 166° F.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
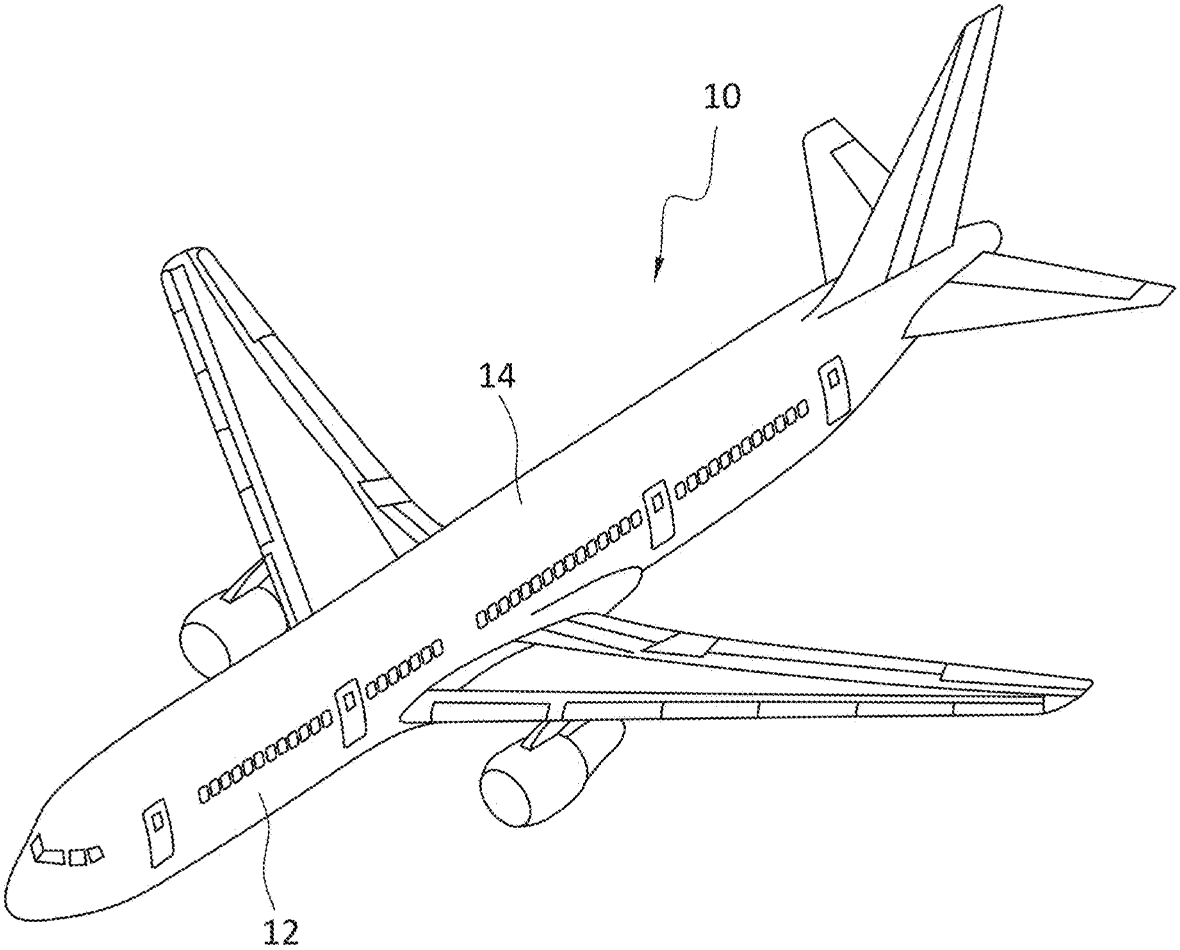
Figure 2:
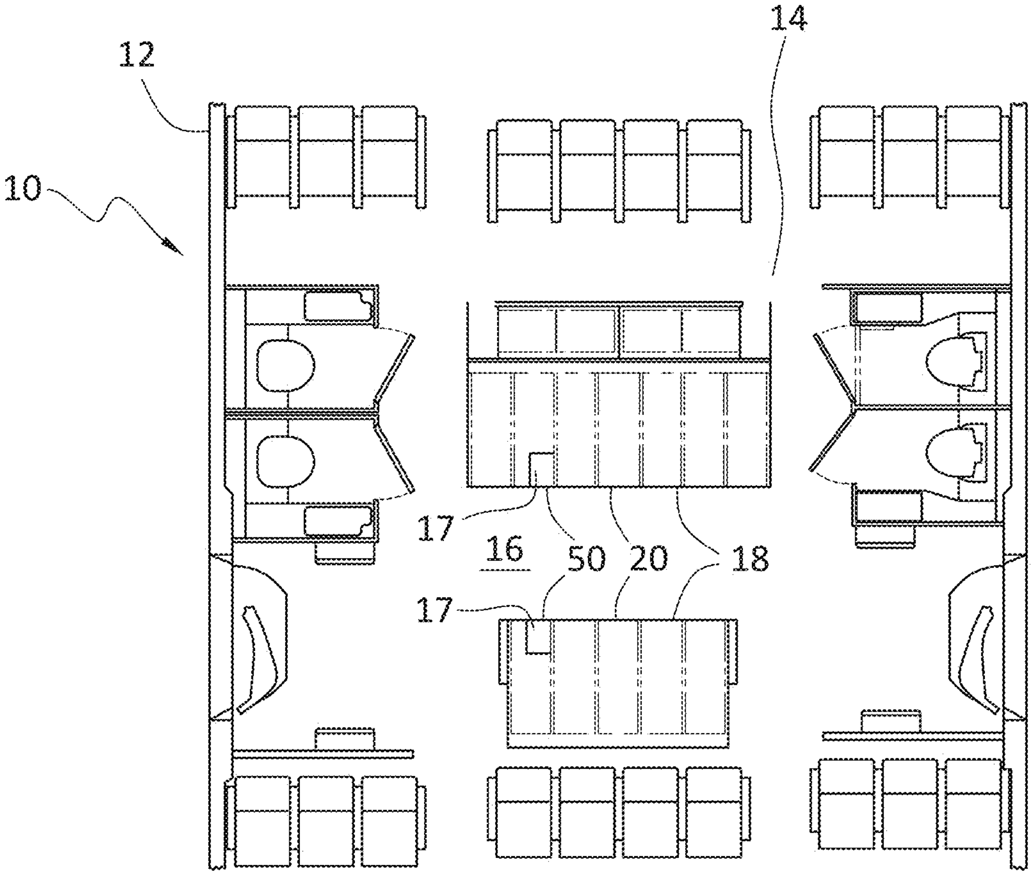
Figure 3A:
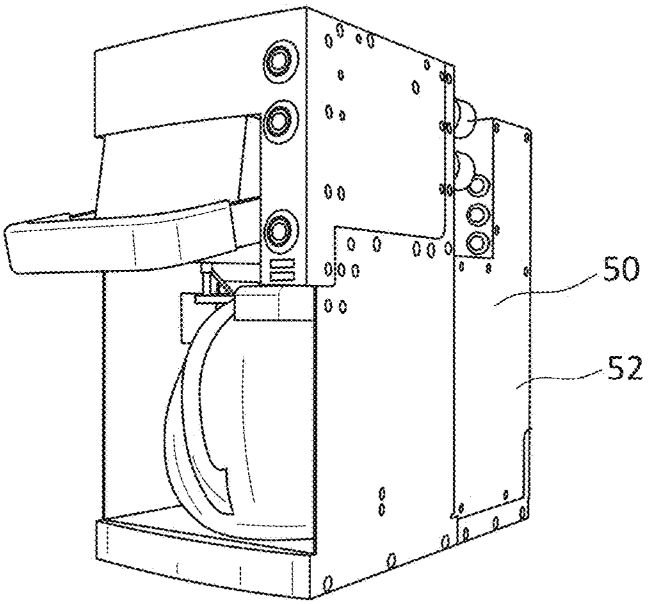
Figure 3B:
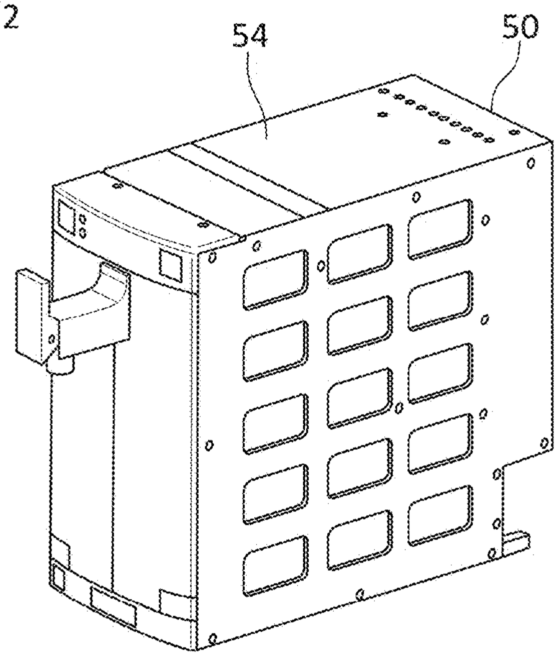
Figure 3C:
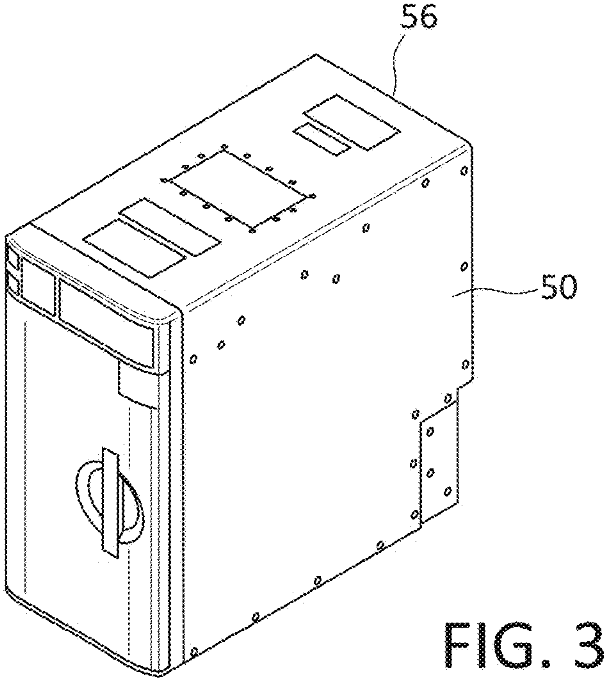
Figure 4:
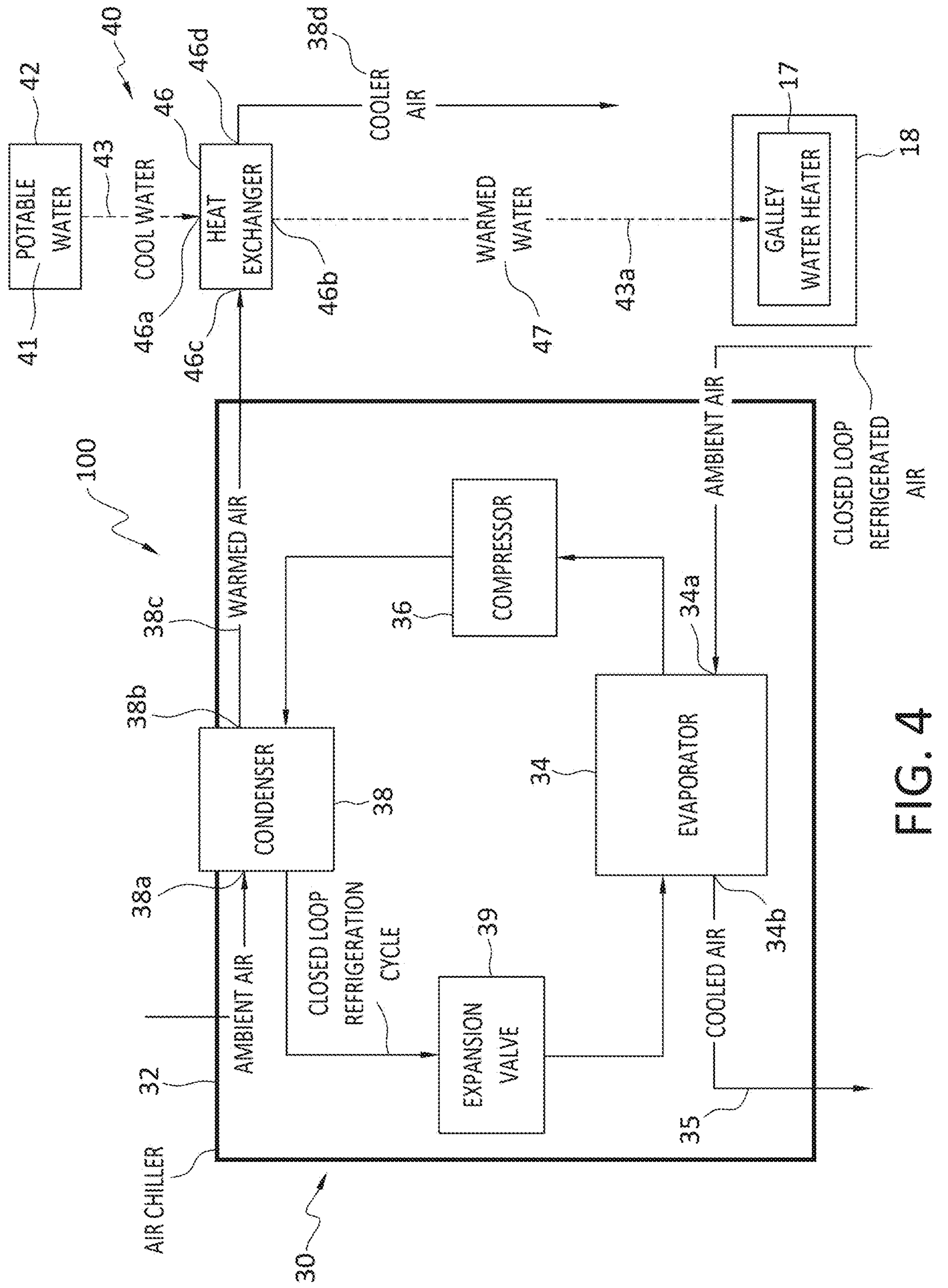
Figure 5:
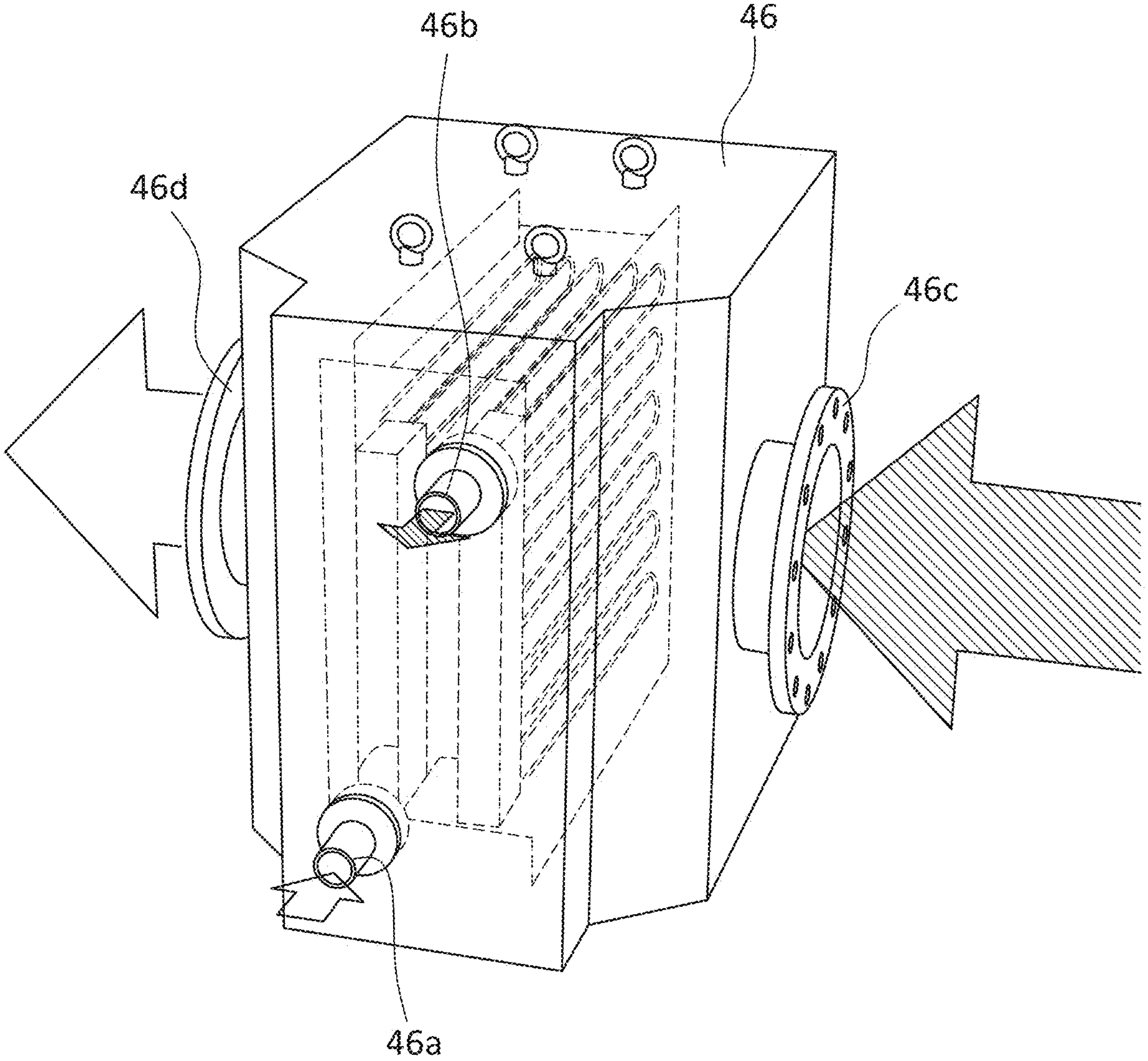

Having thus described variations of the disclosure in general terms, reference will now be made to the accompanying drawings, which are not necessarily drawn to scale, and wherein:

FIG. 1 is an illustration of a vehicle in the form of an aircraft, according to present aspects;

FIG. 2 is an overhead plan view of an aircraft cabin present in an aircraft of the type shown in FIG. 1, according to present aspects;

FIG. 3A is an aircraft water heating appliance in the form of a coffee maker (beverage maker), according to present aspects;

FIG. 3B is an aircraft water heating appliance in the form of a water boiler (beverage maker), according to present aspects;

FIG. 3C is an aircraft water heating appliance in the form of a steam oven, according to present aspects;

FIG. 4 is a box diagram of a system 100, according to present aspects;

FIG. 5 is a partially exposed cross-sectional view of a heat exchanger, according to present aspects.

Figure 6:
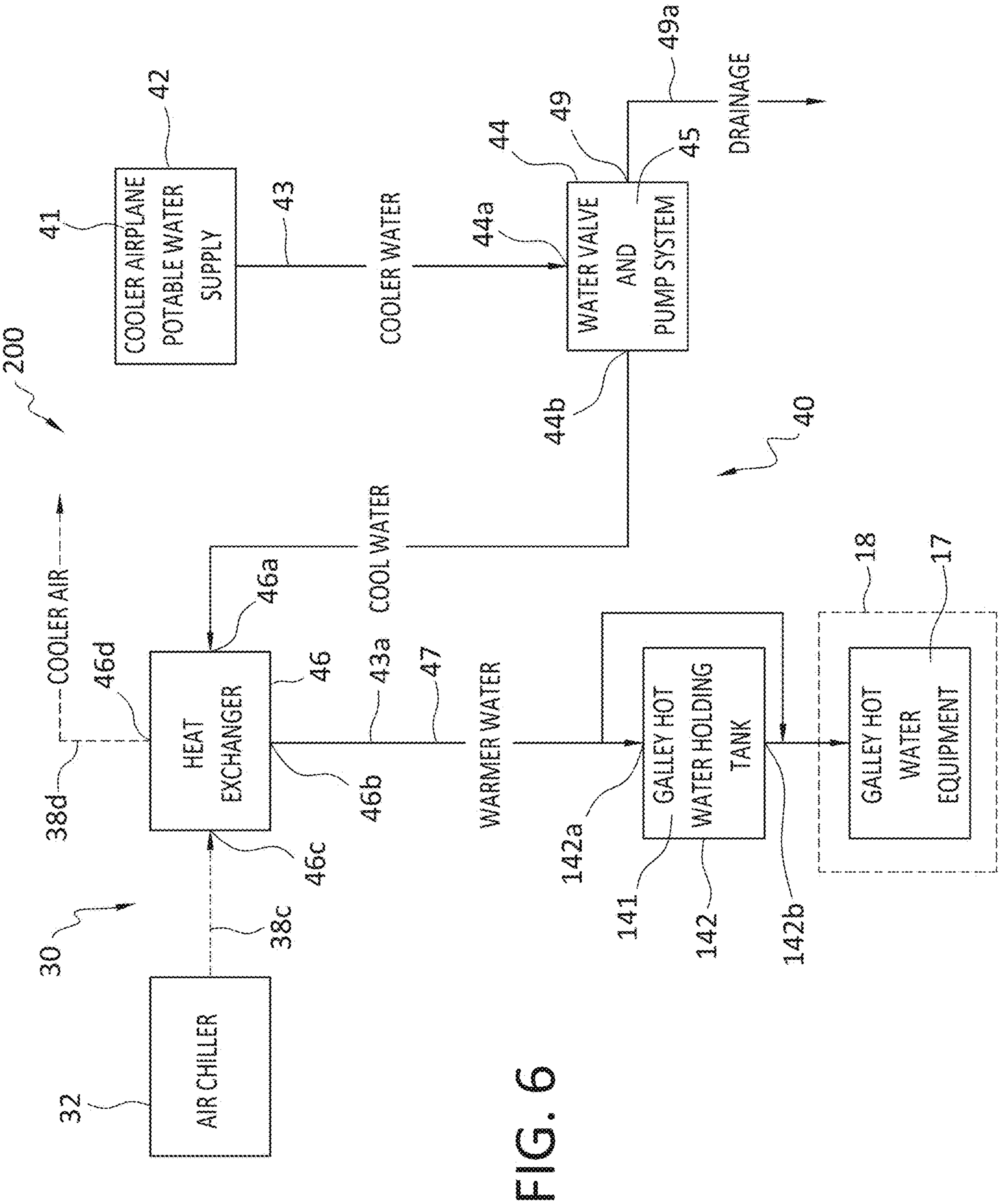
Figure 7:
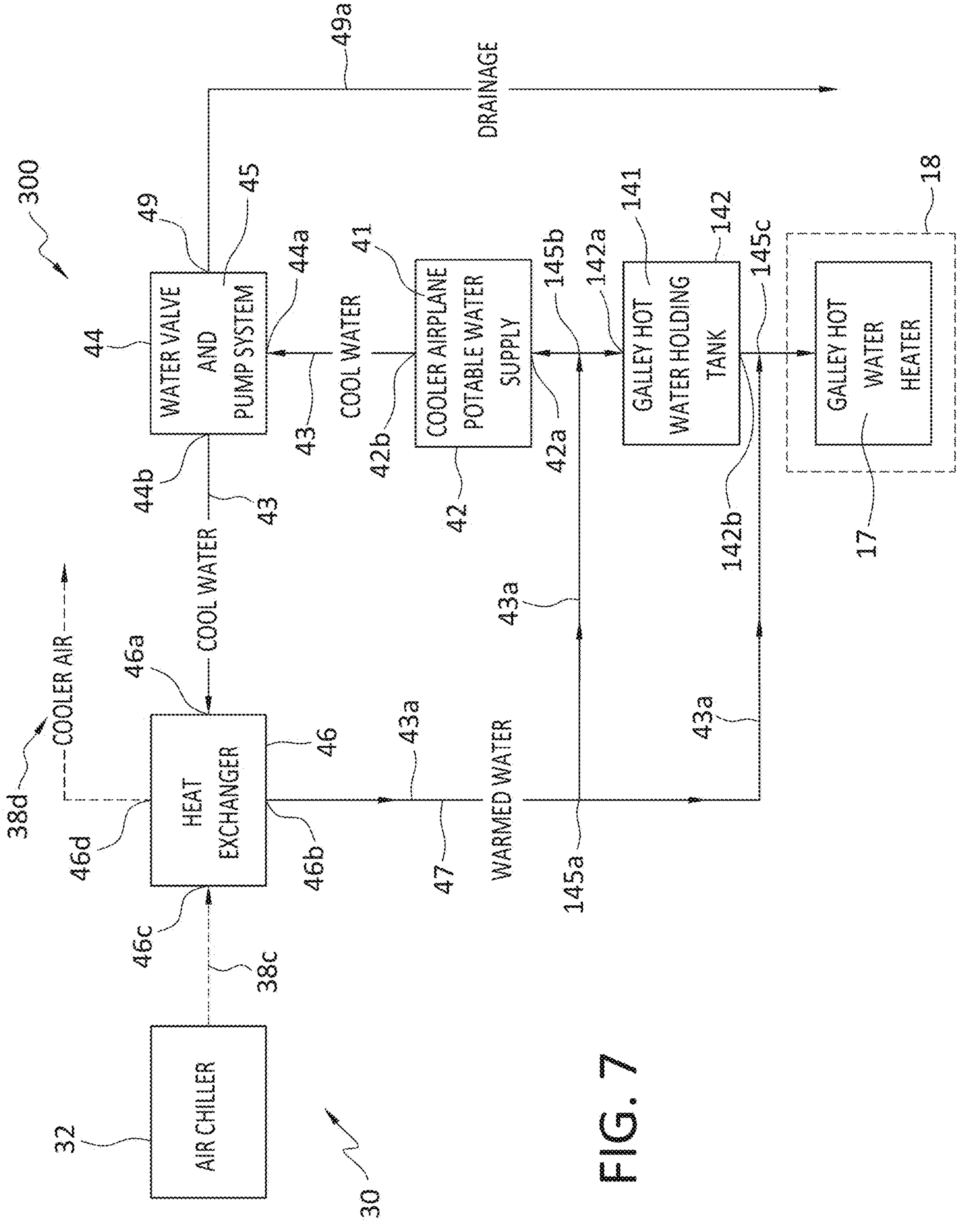
Figure 8:
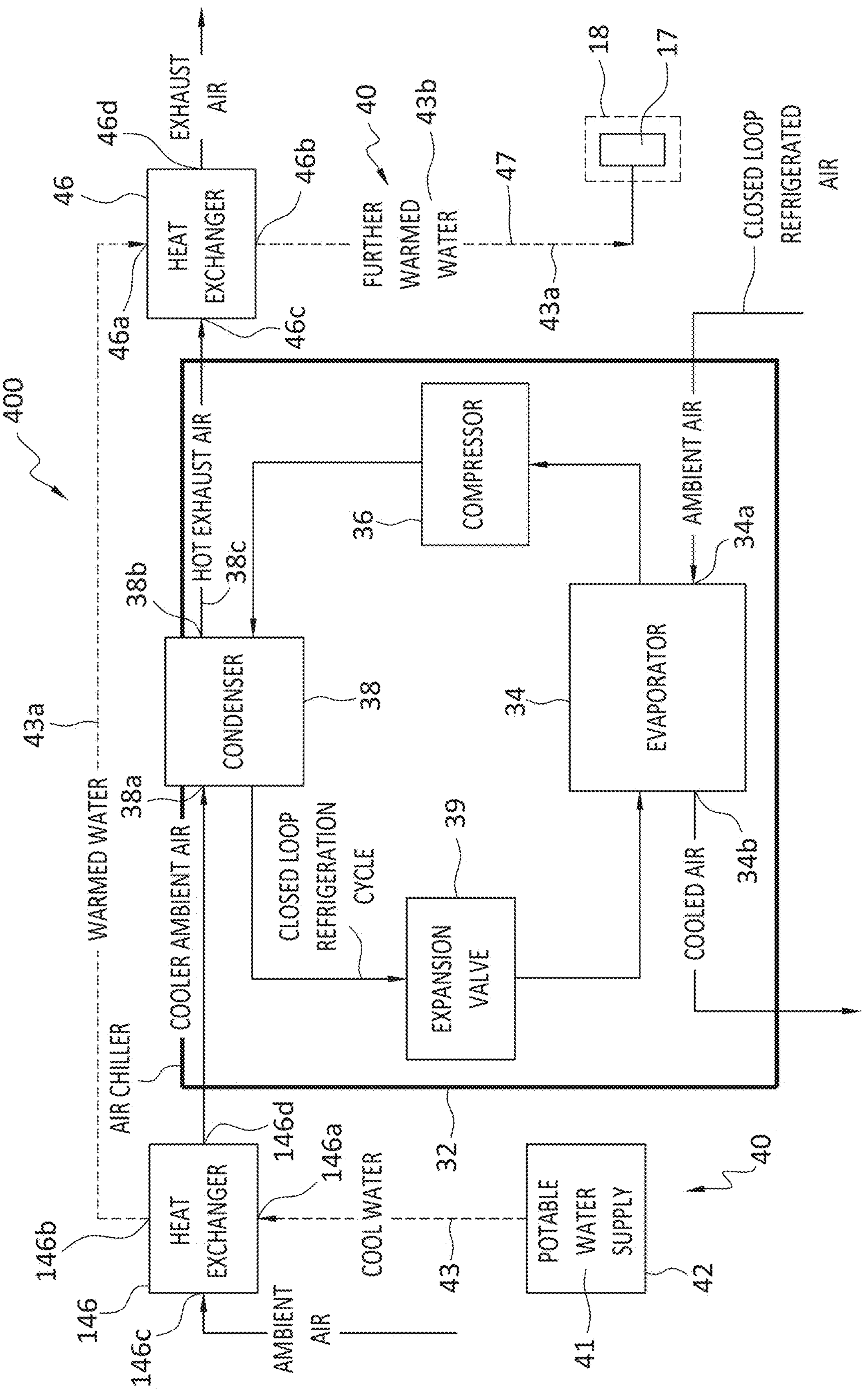
Figure 9:
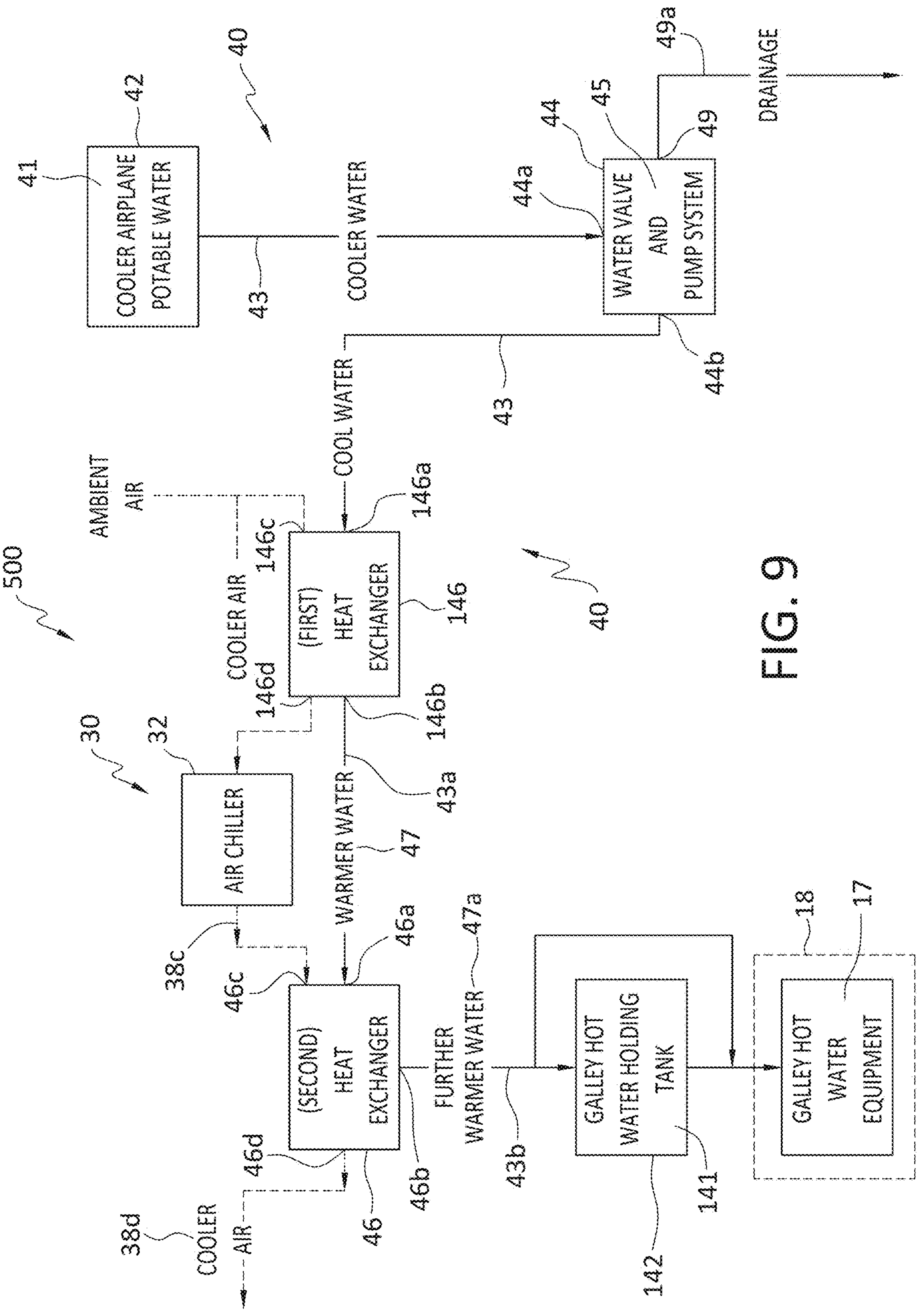
Figure 10:
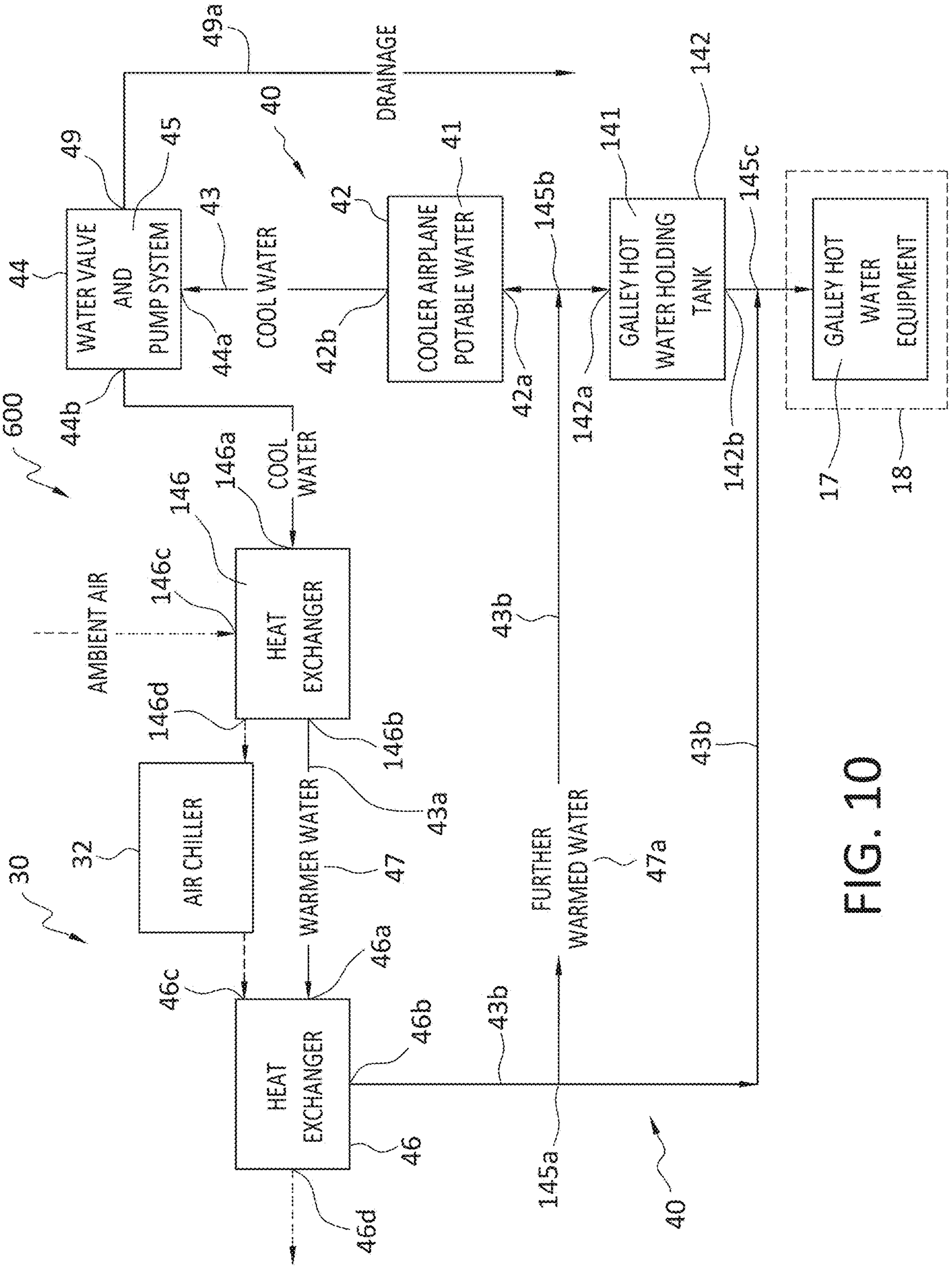
Figure 11:
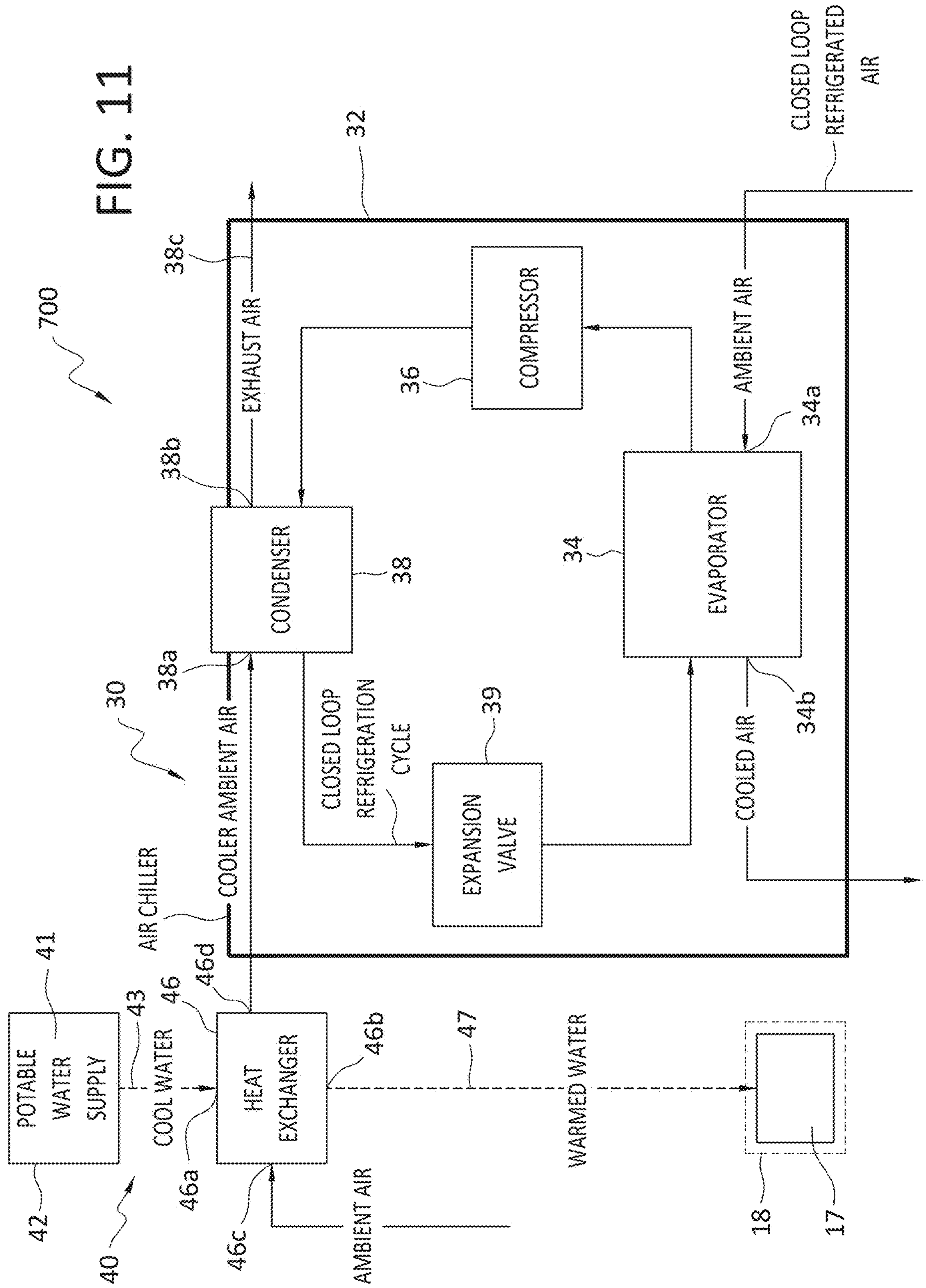
Figure 12:
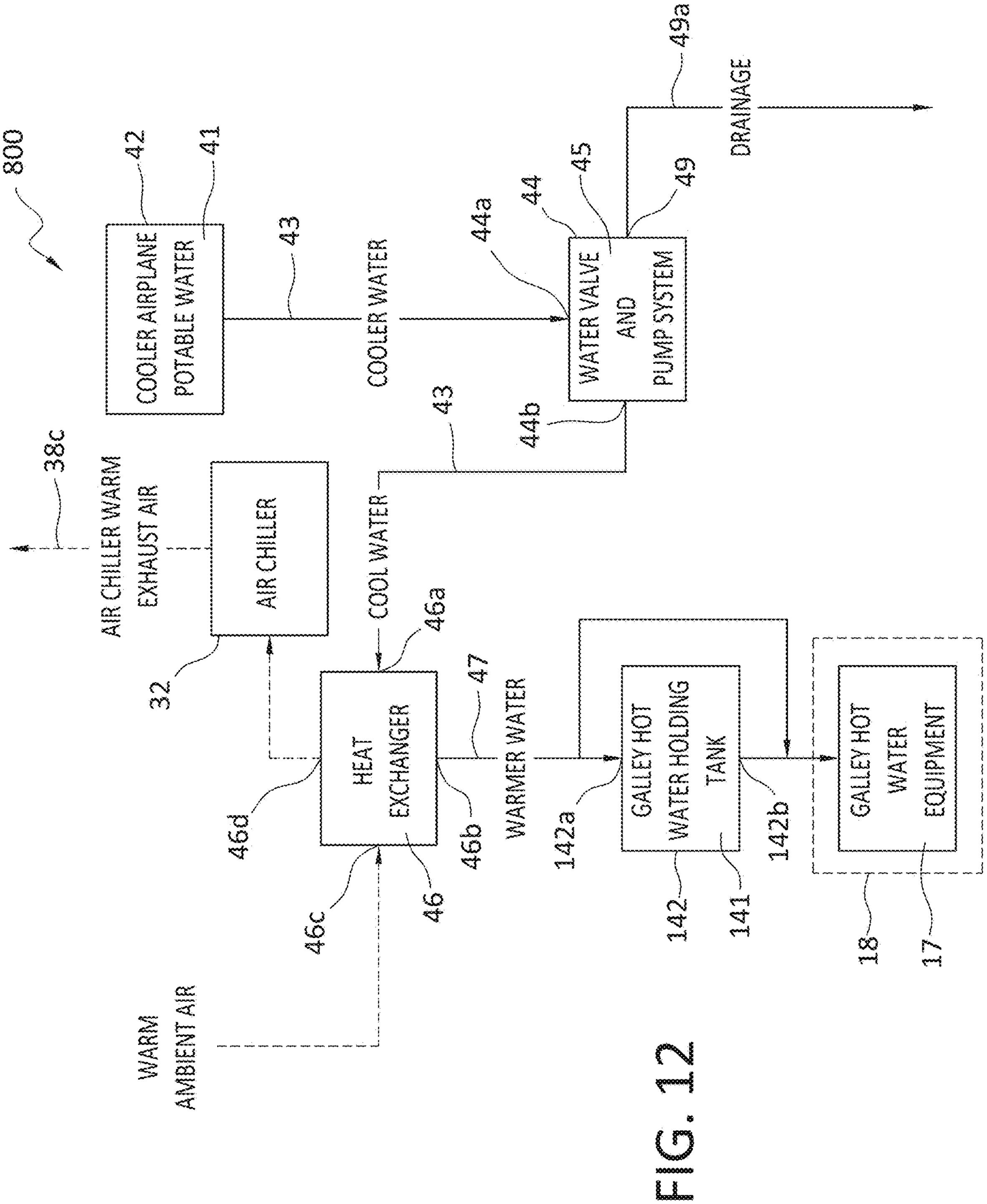
Figure 13:
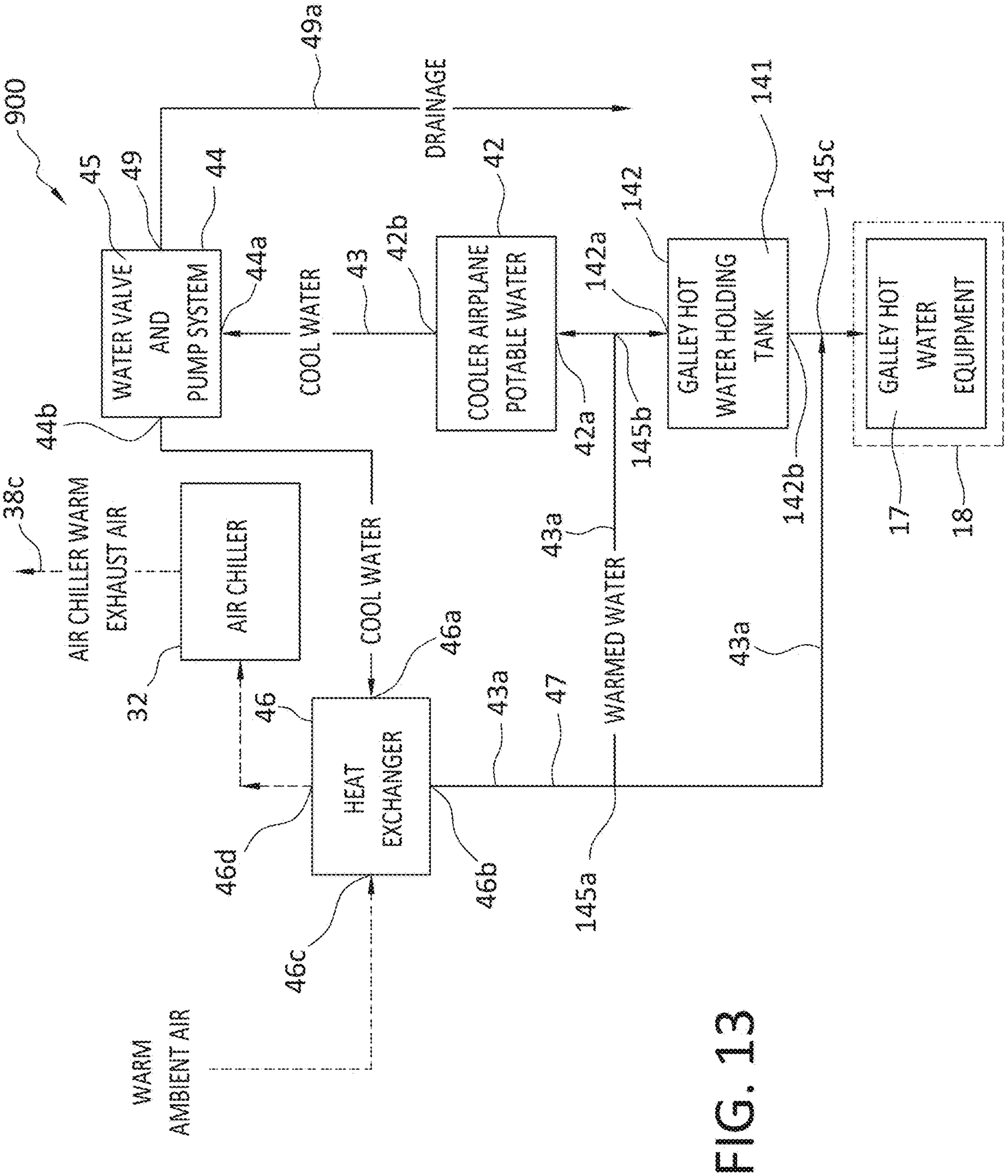
Figure 14:
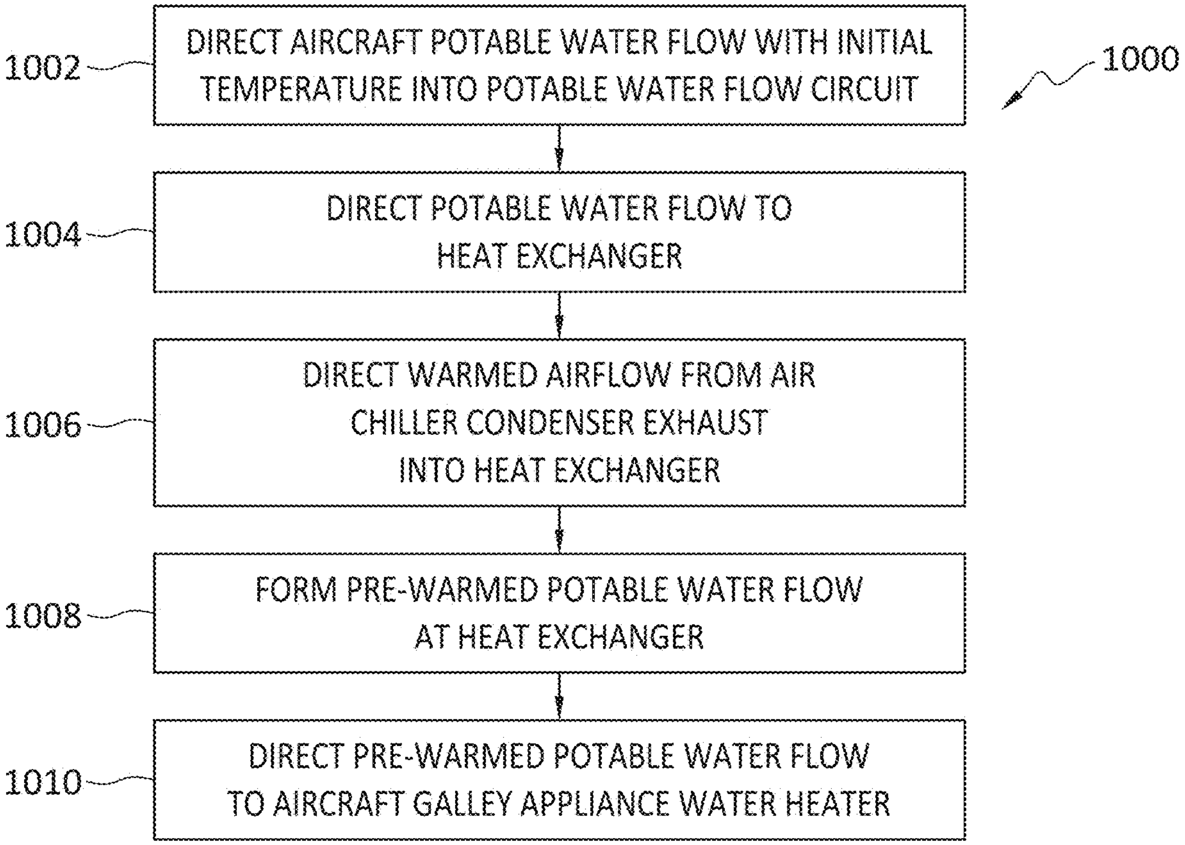
Figure 15:
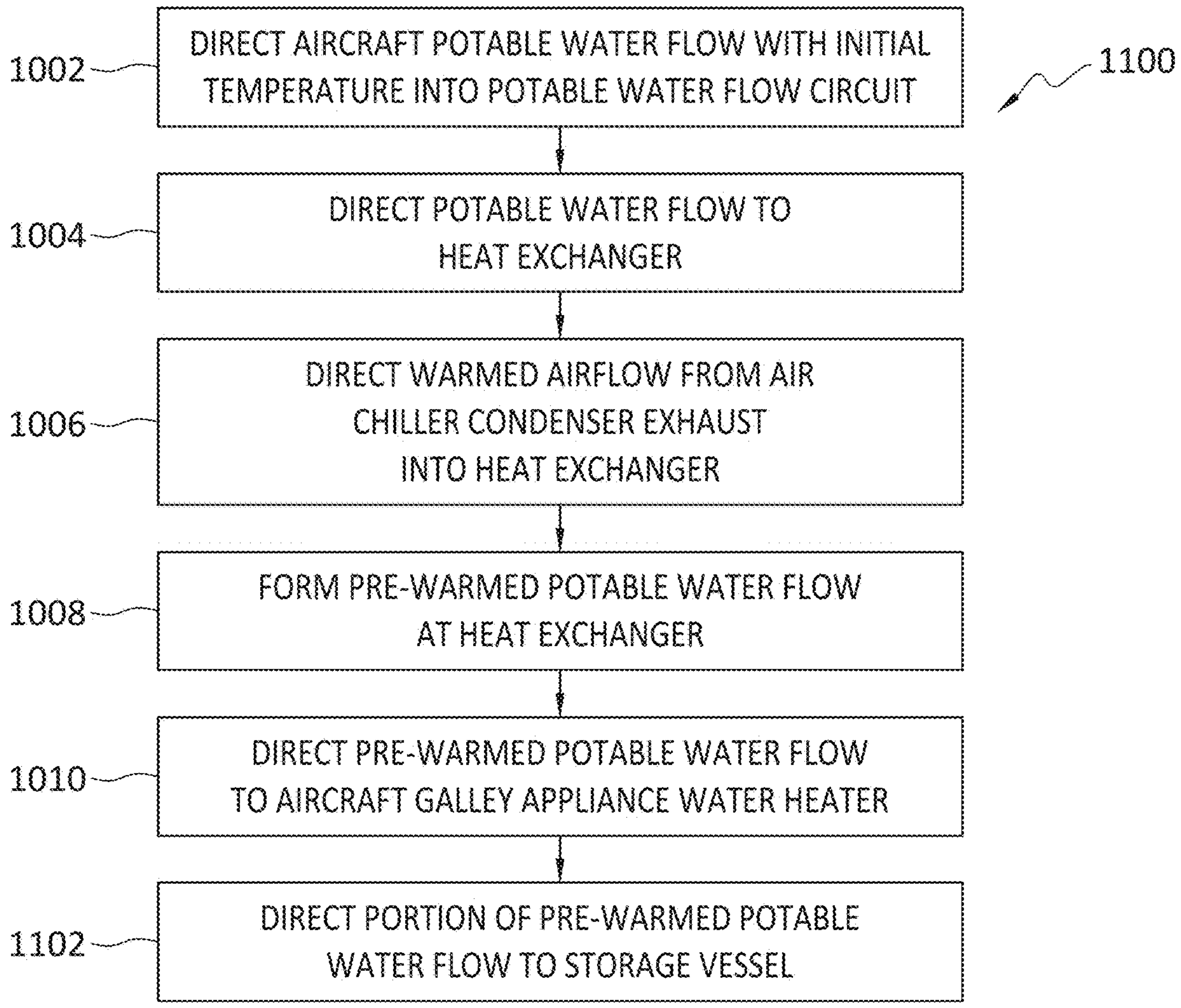
Figure 16:
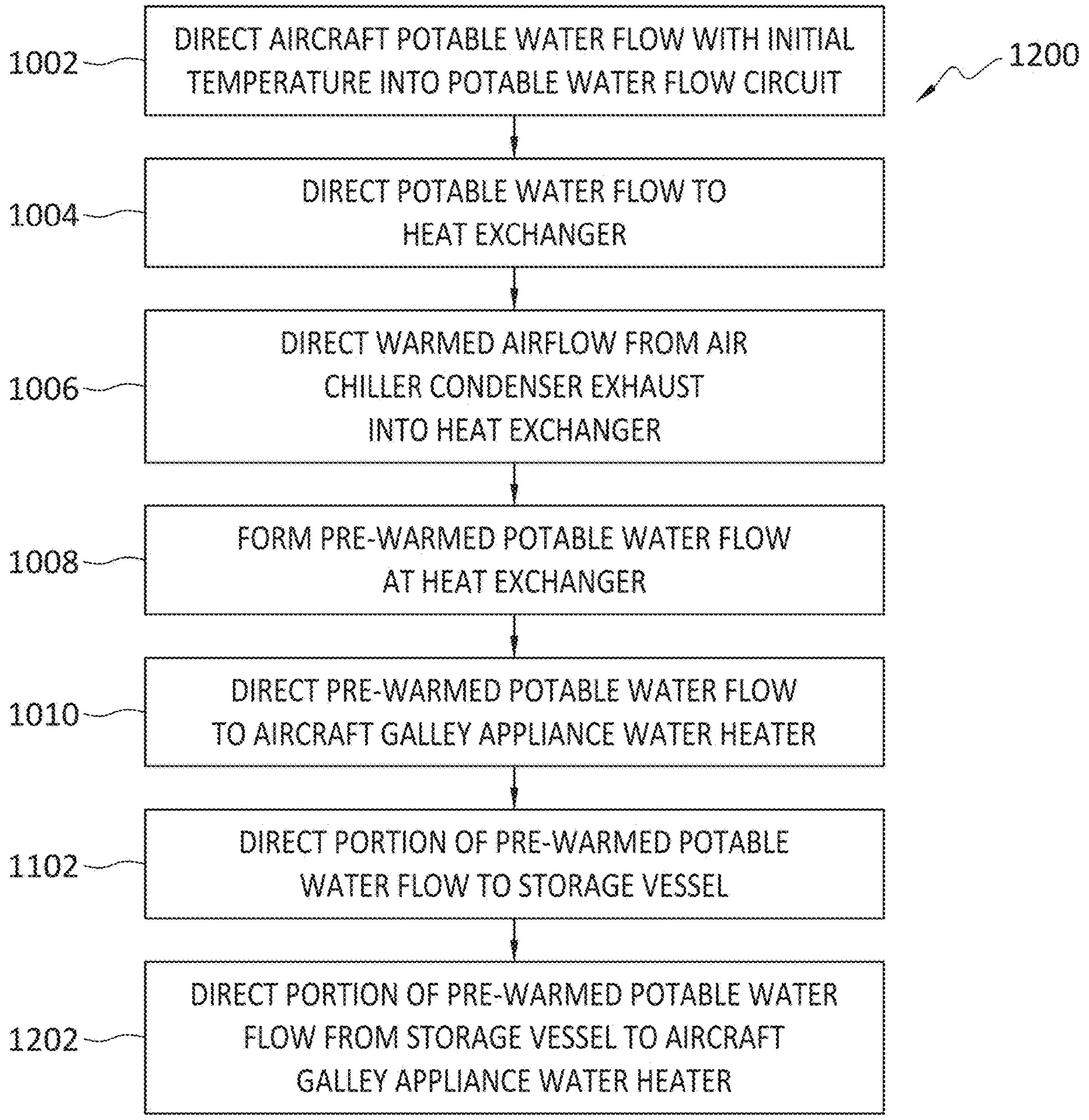
Figure 17:
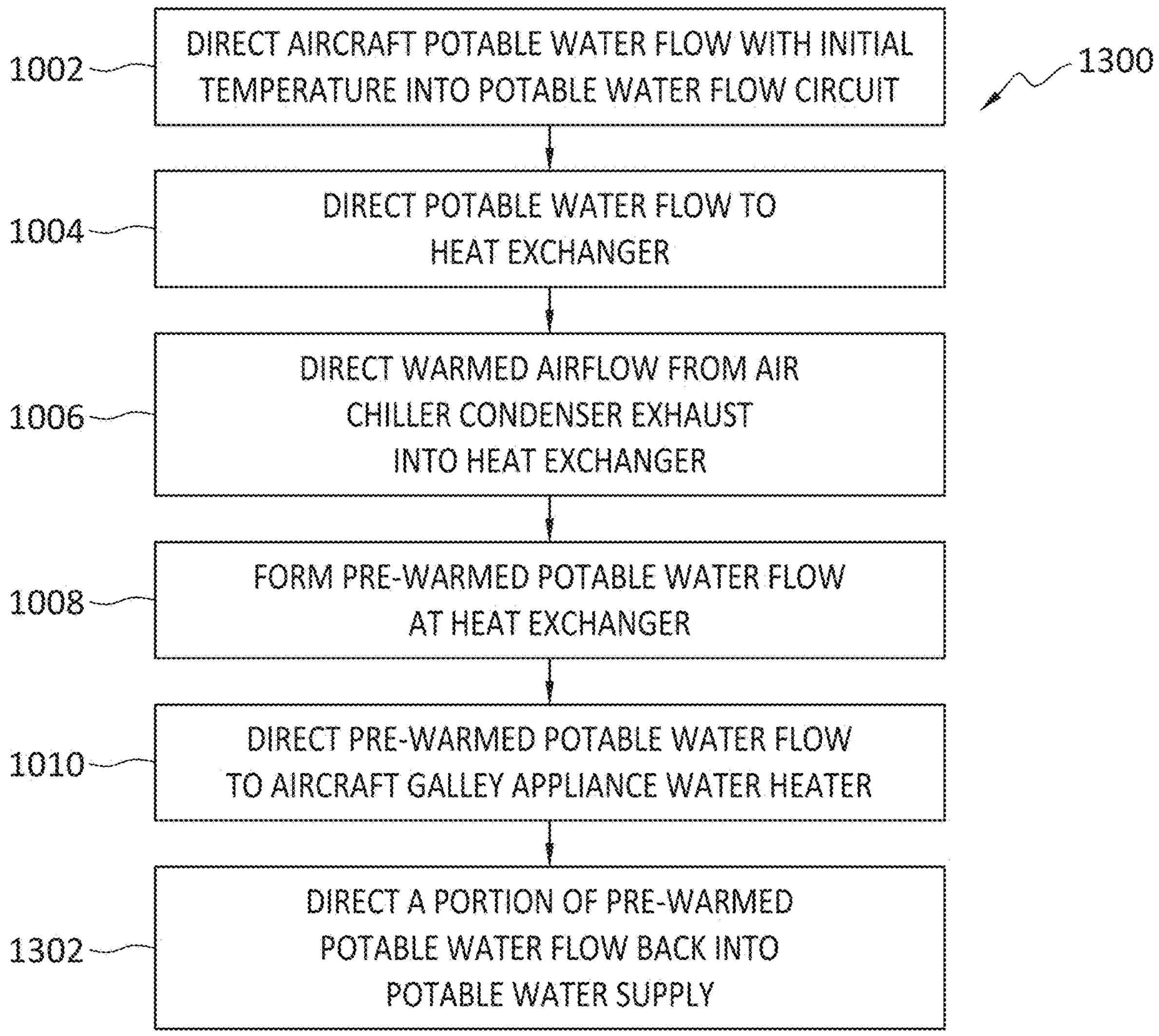
Figure 18:
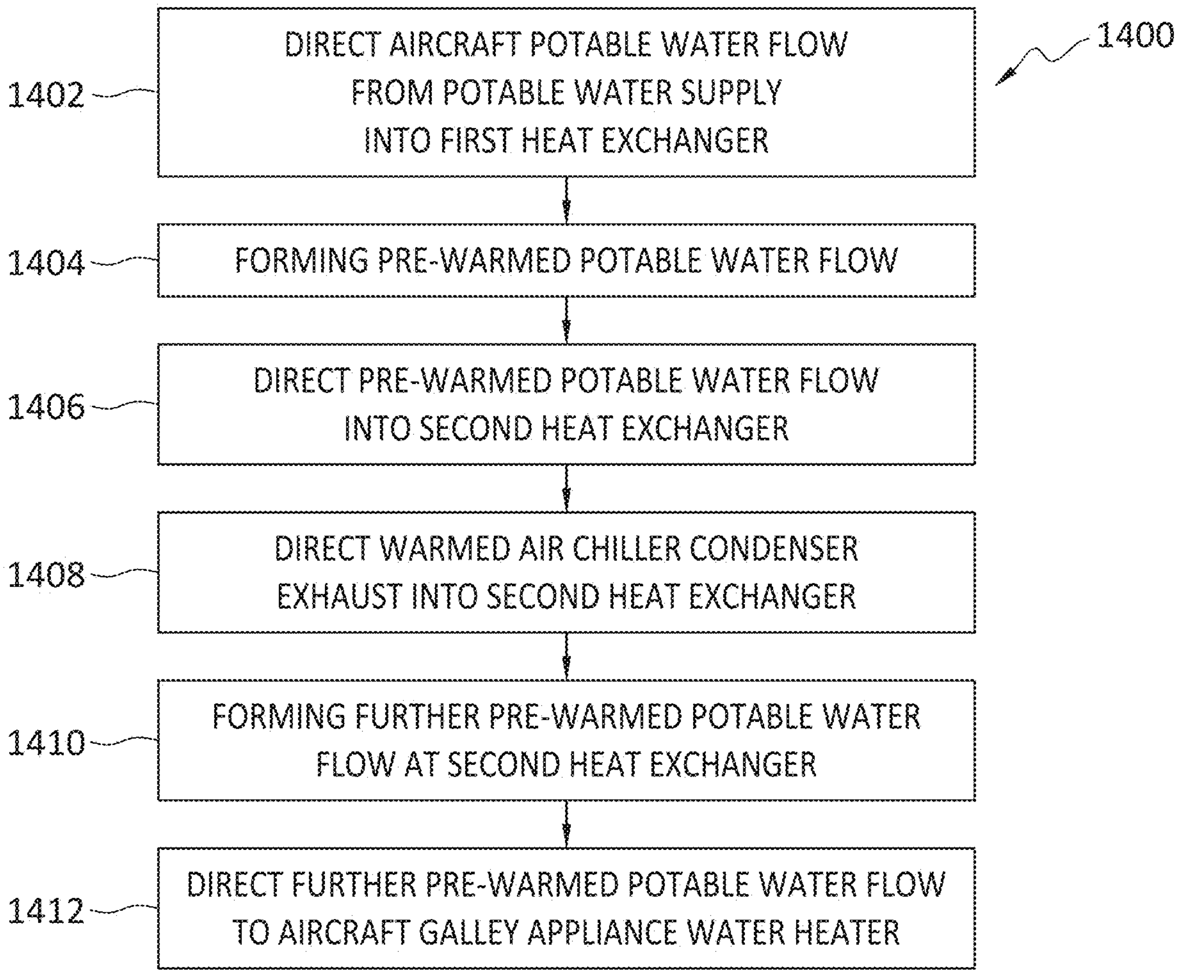
Figure 19:
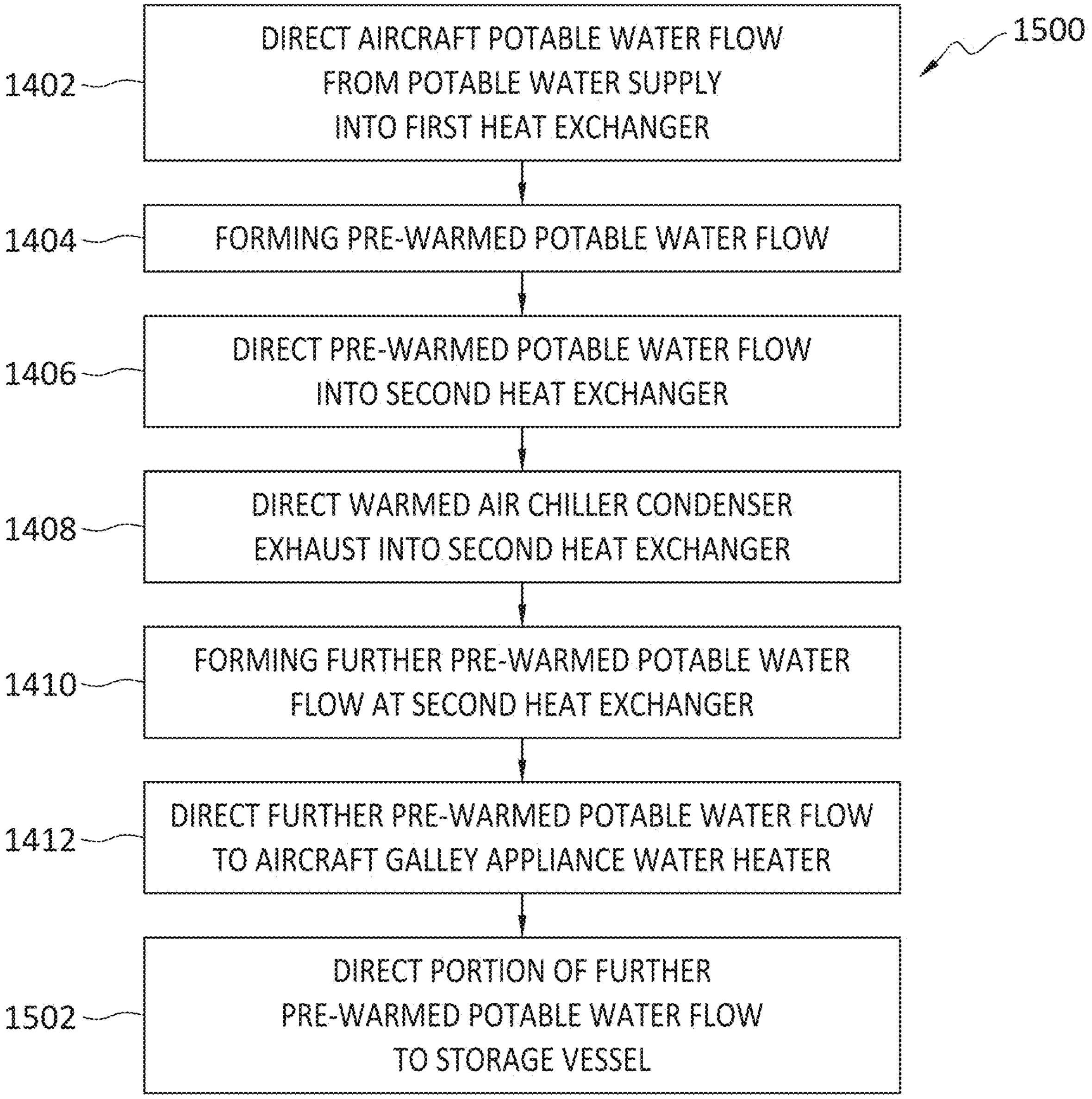
Figure 20:
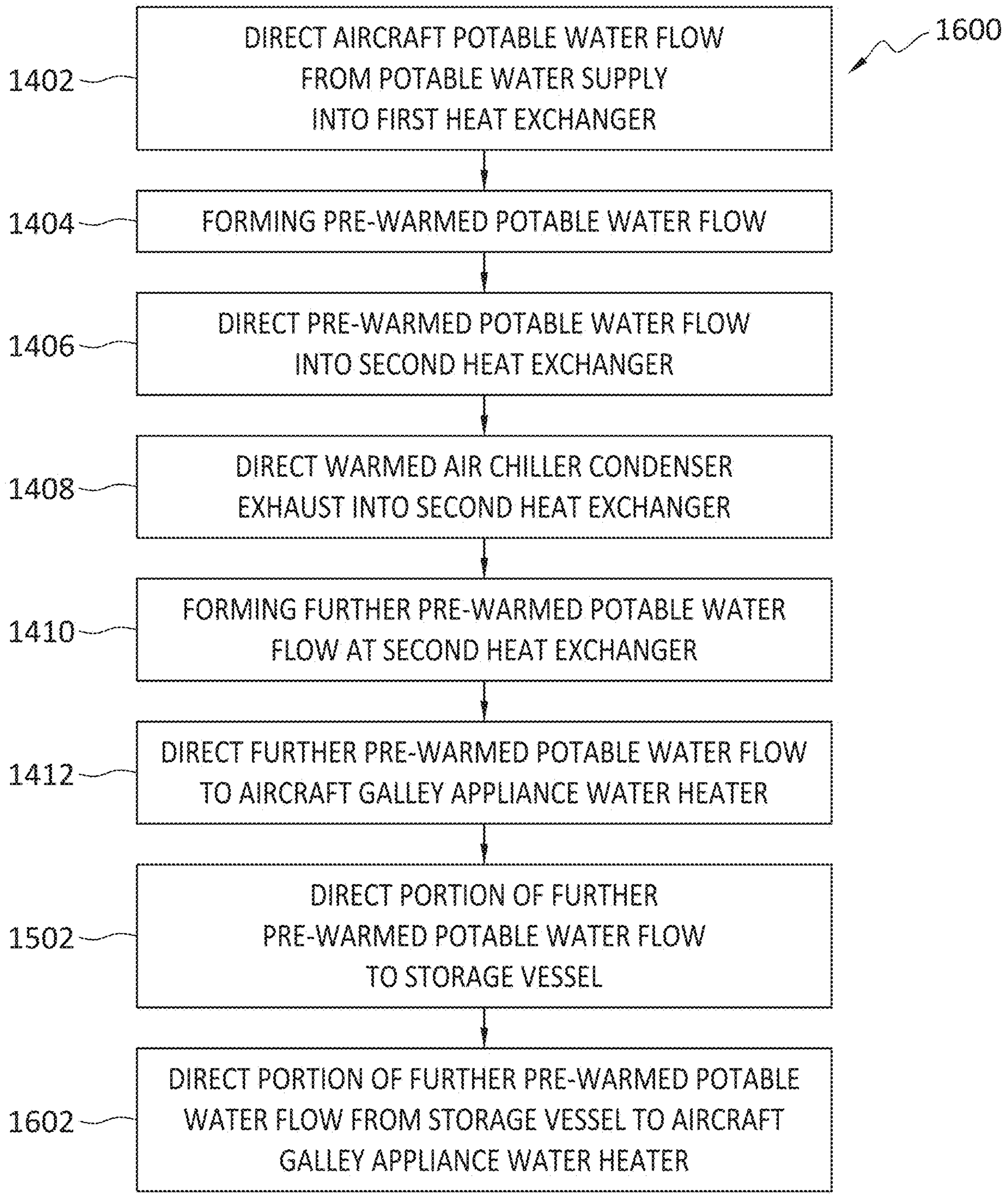
Figure 21:
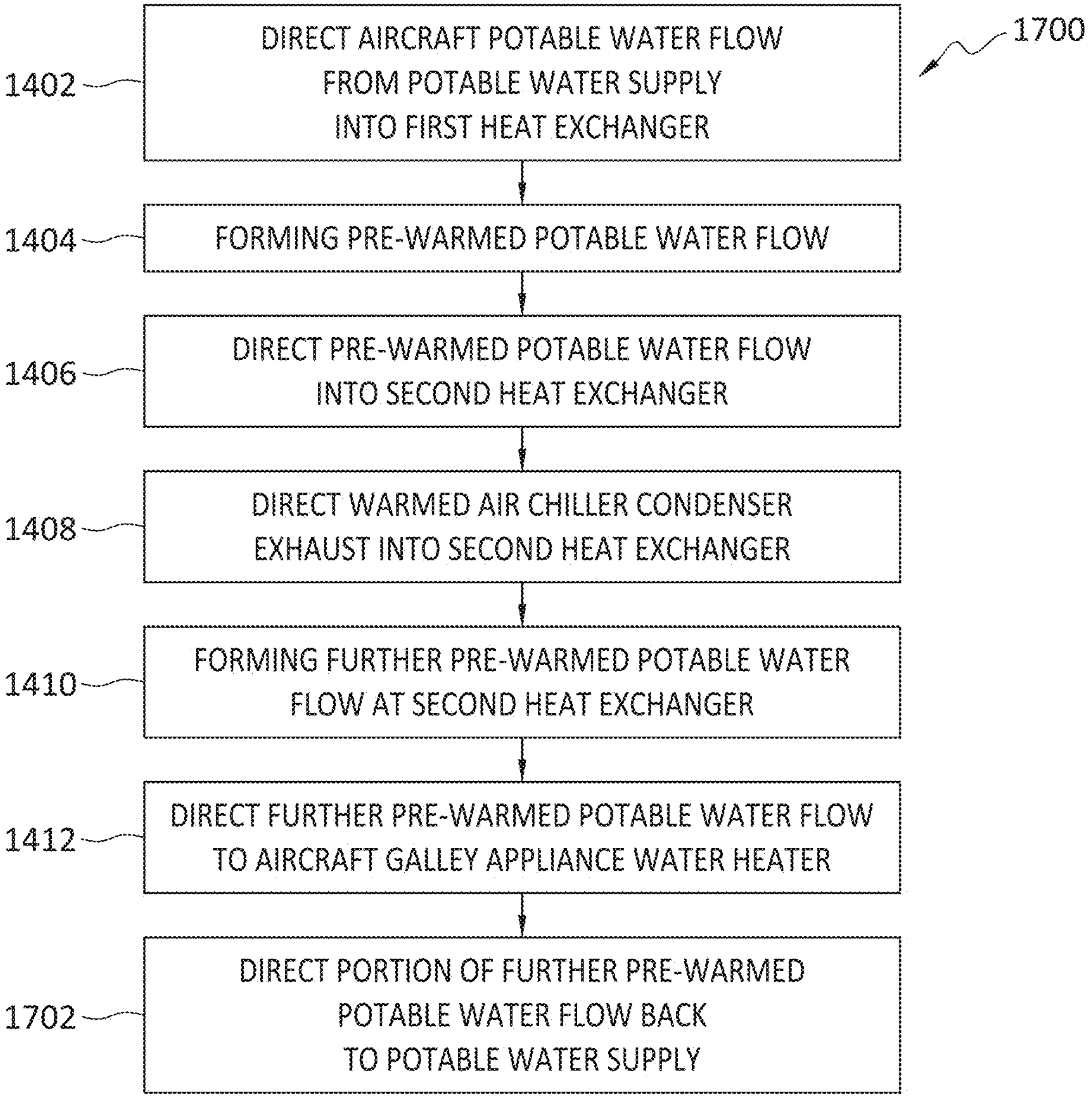
Figure 22:
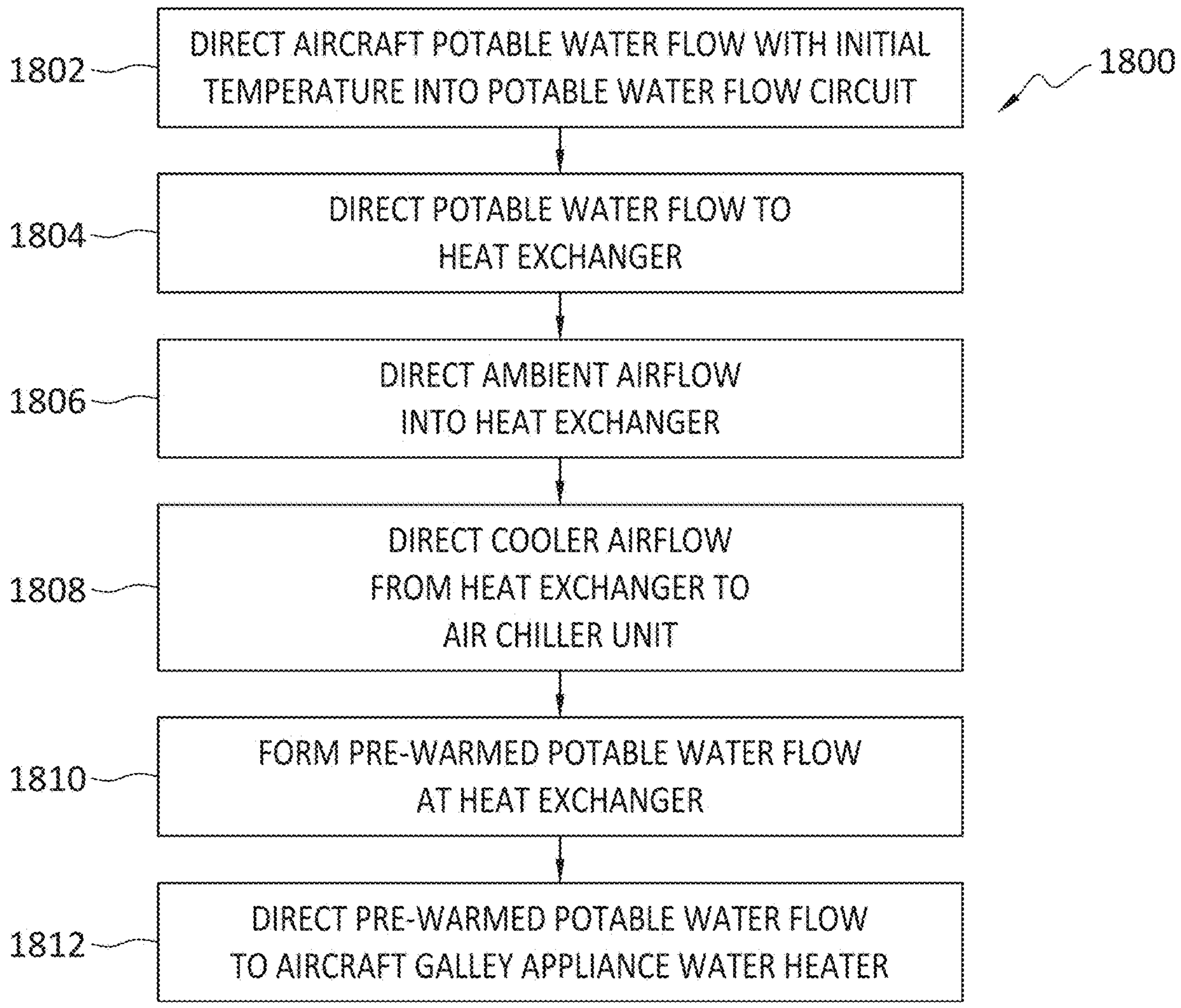
Figure 23:
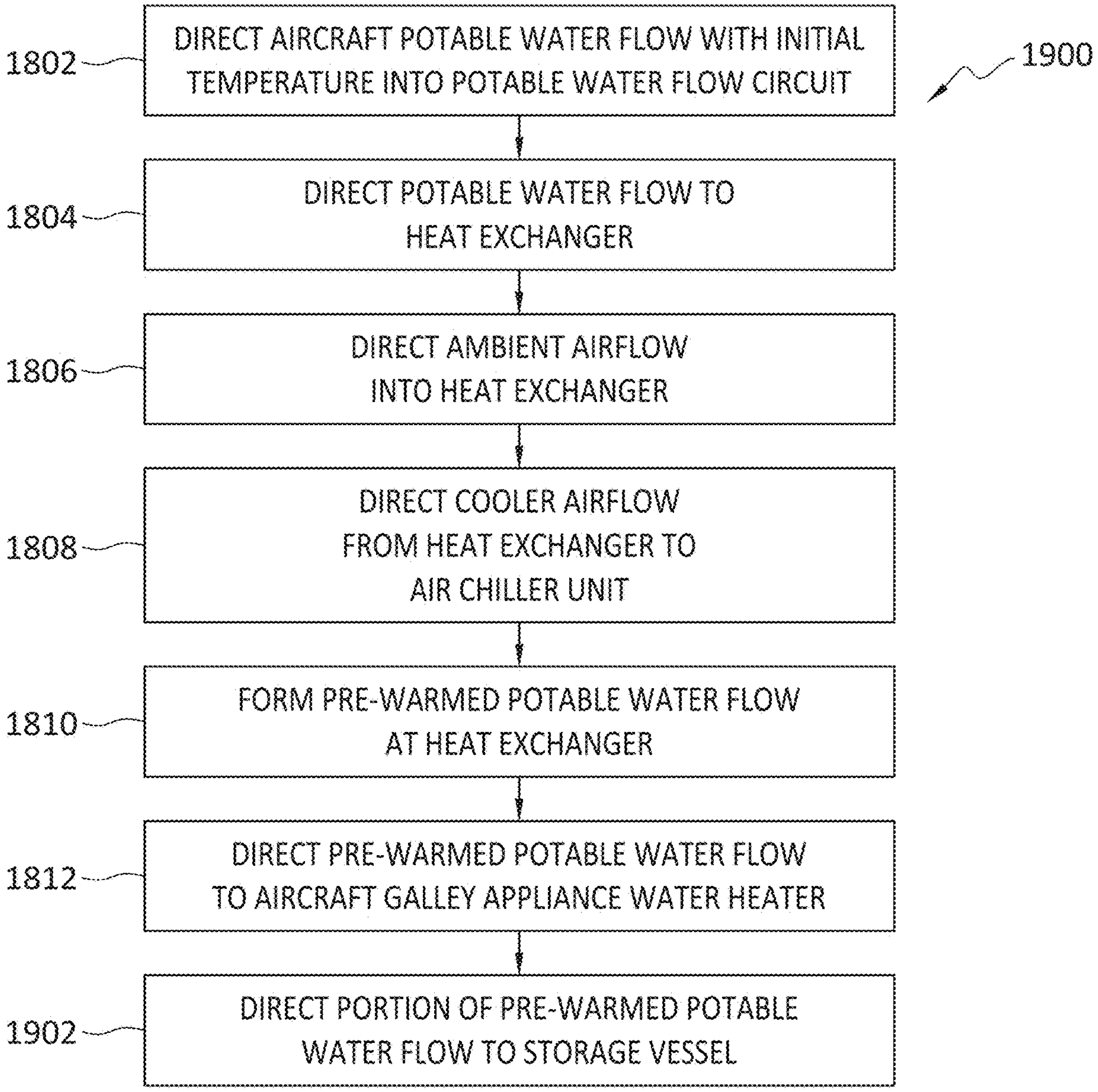
Figure 24:
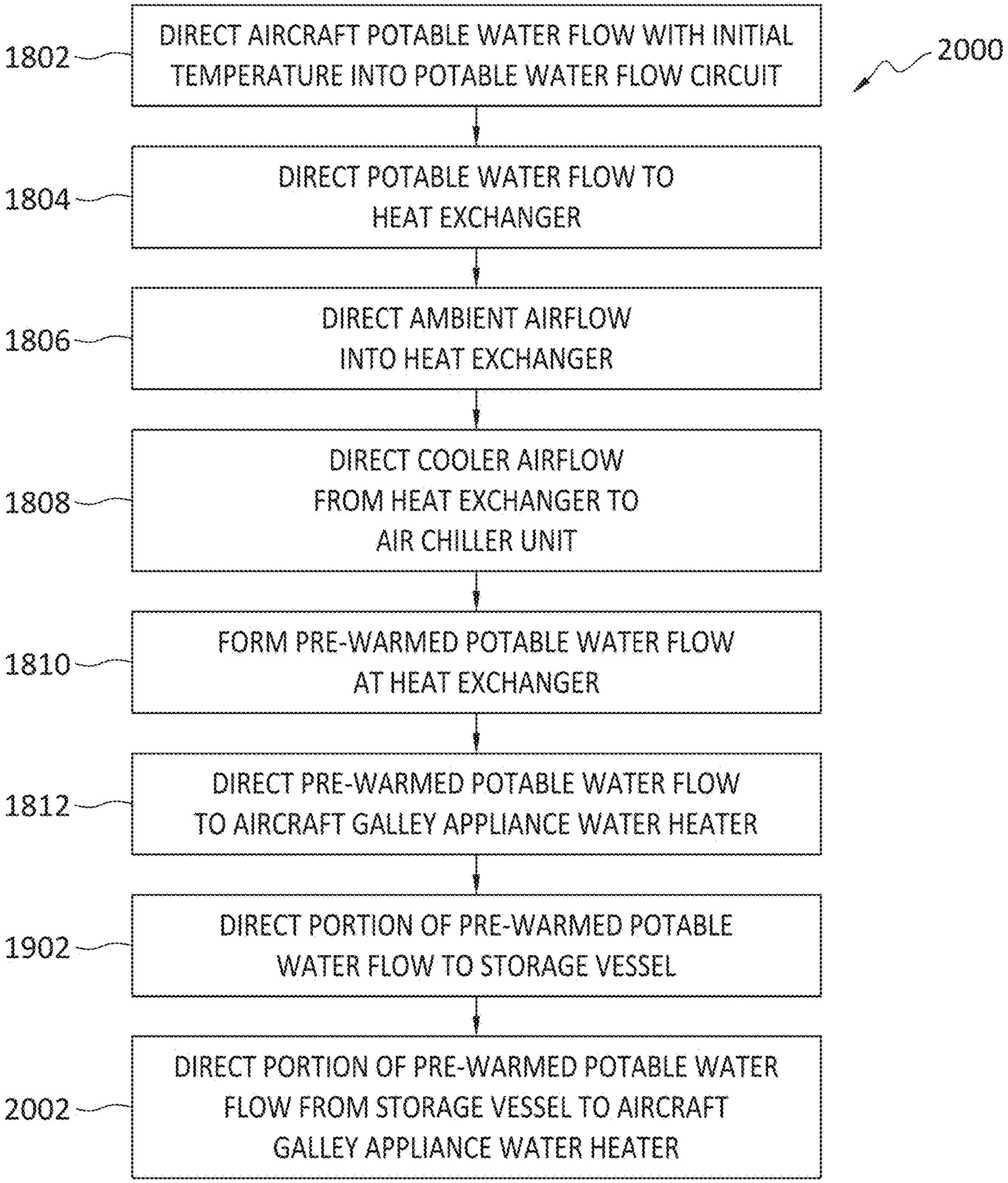
Figure 25:
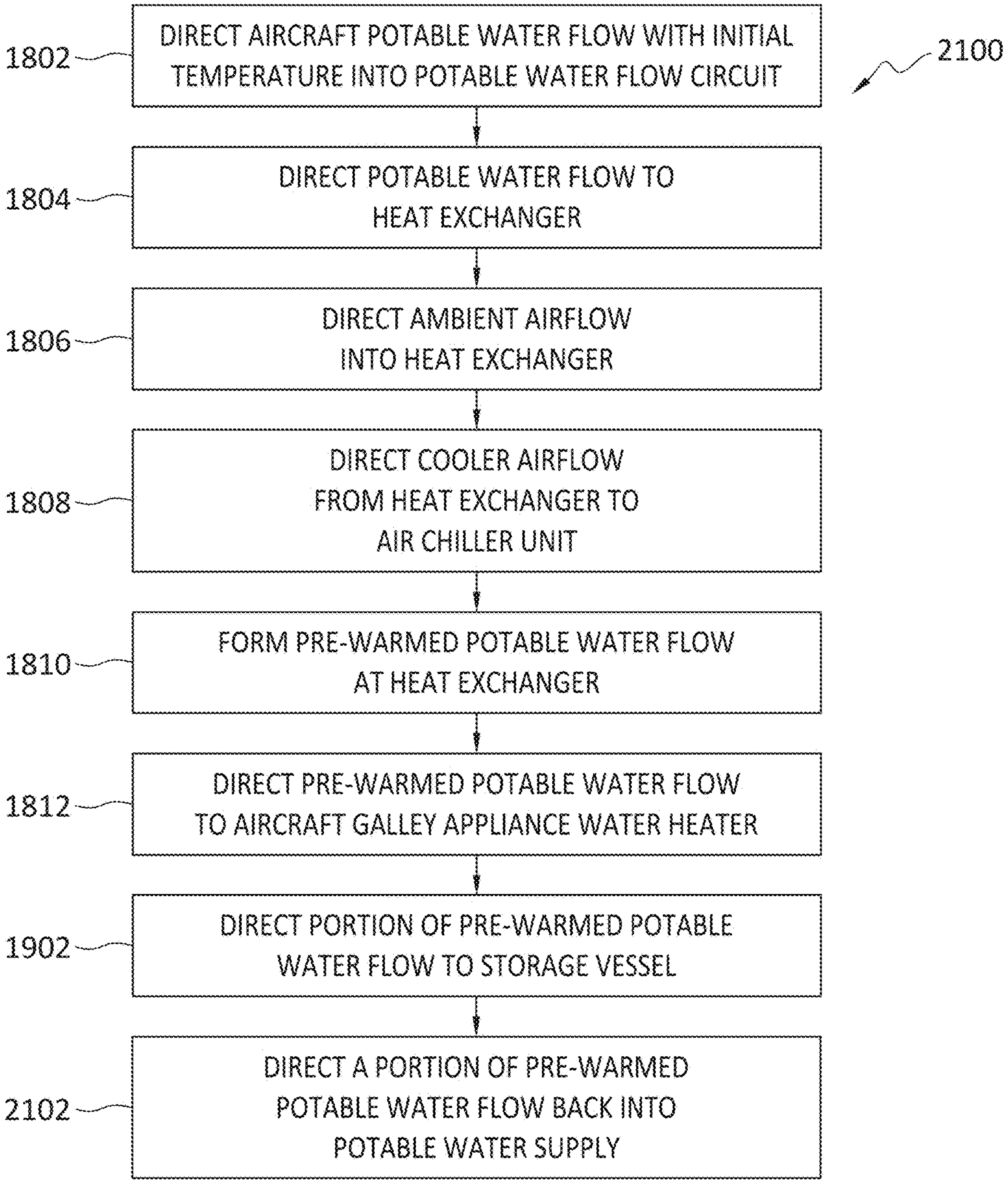

FIG. 6 is a diagram of a system 200, according to present aspects;

FIG. 7 is a diagram of a system 300, according to present aspects;

FIG. 8 is a diagram of a system 400, according to present aspects;

FIG. 9 is a diagram of a system 500, according to present aspects;

FIG. 10 is a diagram of a system 600, according to present aspects;

FIG. 11 is a diagram of a system 700, according to present aspects;

FIG. 12 is a diagram of a system 800, according to present aspects;

FIG. 13 is a diagram of a system 900, according to present aspects;

FIG. 14 is a flowchart outlining a method 1000, according to present aspects;

FIG. 15 is a flowchart outlining a method 1100, according to present aspects;

FIG. 16 is a flowchart outlining a method 1200, according to present aspects;

FIG. 17 is a flowchart outlining a method 1300, according to present aspects;

FIG. 18 is a flowchart outlining a method 1400, according to present aspects;

FIG. 19 is a flowchart outlining a method 1500, according to present aspects;

FIG. 20 is a flowchart outlining a method 1600, according to present aspects;

FIG. 21 is a flowchart outlining a method 1700, according to present aspects;

FIG. 22 is a flowchart outlining a method 1800, according to present aspects;

FIG. 23 is a flowchart outlining a method 1900, according to present aspects;

FIG. 24 is a flowchart outlining a method 2000, according to present aspects; and FIG. 25 is a flowchart outlining a method 2100, according to present aspects.

DETAILED DESCRIPTION

Passenger aircraft typically use a volume of potable water directed from a potable water supply vessel (referred to equivalently herein as a "potable water tank") for multiple passenger and crew uses including, for example, lavatory needs (that can include toilet operation, hand washing, etc.), crew needs, for example, in a galley location, and other uses. Potable water is typically maintained within one or more potable water tanks typically stored in a cargo or equipment bay located beneath a passenger cabin floor, with the potable water tanks typically residing in an area of the aircraft that is typically subjected to cold temperatures when an aircraft is in a flight phase and flying at altitudes with cold temperatures located outside the aircraft.

Potable water tanks on aircraft can include an intake and discharge port that can be the same port capable of providing intake function for filling the potable water tank(s), and a discharge function for depleting/draining the potable water tank(s). A potable water tank can be charged/filled when the aircraft is on the ground from a ground potable water supply that can be a direct ground water supply from a ground-based tank that is pumped into the aircraft potable water tank(s). In addition, a ground potable water tanker-type vehicle can transfer potable water, for example, from a ground water tank, into the aircraft potable water tank(s). In both instances, the potable water that is transferred into aircraft potable water tank(s) is typically delivered at a below-ambient temperature such that the potable water is in an initial "cooled temperature" ranging from about 35° F. to about 77° F.

Potable water temperature can increase within the aircraft potable water tank(s) when an aircraft is on the ground (e.g., if the ambient outdoor temperature is warm with temperatures ranging from about 80° F. or more). However, once an aircraft is airborne and reaches an altitude, for example, in excess of about 10,000 feet, the ambient temperature outside of the aircraft during flight can reach cold ambient outdoor temperatures ranging from about (minus) −20° F. to about 0° F., etc. Accordingly, potable water typically enters an aircraft (e.g., is delivered from an exterior potable water source into an aircraft, etc.) at below ambient temperatures and, due to the location of potable water tanks on aircraft "below-deck" (e.g., in aircraft equipment and cargo bays that are not typically heated, etc.), an aircraft potable water supply in aircraft potable water tank(s) is typically directed from an aircraft potable water supply, in flight, to aircraft cabins at "cool" temperatures ranging from about 40° F. to 50° F.

In another example, an aircraft potable water supply, for example, can be housed within a container in the form of a "tank" that can be located in aircraft locations also typically not heated including, for example, in an aircraft crown (e.g., located above an aircraft passenger cabin ceiling, etc.). In another example, an aircraft can comprise multiple potable water tanks located at the same or differing aircraft locations or regions (e.g., one or more potable water tanks located "below-deck" as well as one or more tanks located in the aircraft crown, etc.).

According to present aspects, potable water sources (e.g., a water supply in a vessel and/or a container that can be a water tank, etc.) on an aircraft represent a source of cool material flow that presents a thermal (e.g., temperature) delta between the potable water flow from a potable water supply temperature and points along a potable water flow circuit (referred to equivalently herein as a "potable water flow pathway") directed from a potable water supply along and within a potable water circuit. That is, according to present aspects, a potable water flow in an aircraft can be configured to absorb and/or release heat during a thermal exchange occurring between an initial potable water flow temperature and a higher temperature that the potable water flow encounters in the potable water circuit after leaving the potable water supply, and that can be, for example, components of a chilling air circuit that can include an air chiller condenser exhaust and a heat exchanger that is in direct communication with both a potable water flow and a directed air flow exhaust from an air chiller condenser including from an air chiller condenser warm/hot air exhaust. In one present example, the air chiller condenser exhaust can disperse a war/hot air flow from the exhaust at a temperature ranging from about 128° F. to about 166° F.

According to further present aspects, a potable water flow that has an initial water temperature that can be below the ambient temperature of an aircraft passenger cabin is configured to absorb heat at least one heat exchanger in an aircraft onboard potable water circuit to increase the temperature of the potable water within the potable water circuit (referred to equivalently herein as a "potable water pathway") to form "pre-heated" potable water (referred to equivalently herein as "pre-warmed potable water") having a selected pre-heated temperature, and with the "pre-heated" potable water having the selected pre-heated temperature directed to an aircraft galley appliance water heater for an aircraft galley appliance.

According to present aspects, a volume of ambient temperature potable water having an initial potable water temperature is released from a potable water supply to form an ambient temperature potable water flow delivered into a potable water circuit. The ambient temperature potable water flow is placed in direct contact with at least one heat exchanger, with the heat exchanger positioned and otherwise configured to directly receive into the heat exchanger a flow of heated air from an air chiller condenser exhaust of an air chiller unit in a chilled air circuit.

According to present aspects, a potable water flow is configured to harvest, absorb, and otherwise "scavenge" waste heat from an air chiller circuit onboard an aircraft for the purpose of increasing a potable water temperature within a potable water flow that is directed to an aircraft galley water heater of an aircraft galley water-heating appliance to significantly reduce the electrical power needed to heat potable water to a selected temperature approaching about 196° F. In one present example, the present systems raise the initial potable water flow temperature ranging from about 35° F. to about 77° F. to a pre-warmed potable water flow exiting a heat exchanger having a temperature ranging from about 110° F. to about 165° F.

In one present example, within the heat exchanger, the potable water flow in the potable water circuit is configured to directly absorb heat from the heated air exhaust exiting an air chiller condenser from the condenser exhaust "side" of the air chiller unit that is positioned proximate to the heat exchanger air intake.

A thermal exchange occurs at the heat exchanger that increases the temperature of the potable water flow through the heat exchanger, while decreasing the temperature of the warm air flow delivered from an air chilling circuit (e.g., including from an air chiller condenser exhaust) that is introduced into the heat exchanger air intake and that proceeds through the heat exchanger, and exits the heat exchanger as a lower temperature air flow that can be usefully reintroduced into the chilled air circuit to further improve a chilled air circuit efficiency and that can further reduce an electrical power draw (e.g., an electrical power demand to run the chilled air circuit). According to a present example, in operation, the presently disclosed systems afford a system efficiency increase of both: 1) a potable water-heating function for an aircraft galley appliance water heater; and 2) an aircraft air chilling function that can be made to occur substantially concurrently.

The presently disclosed systems and methods can further realize a significant reduction in the electrical power used to heat a water flow (from an initial water flow temperature to a temperature ranging from about 190° F. to a temperature approaching about 196° F.) for heating food and dispensed hot beverages, while also substantially concurrently decreasing the electrical power used to produce and/or maintain a lower than ambient temperature chilled air flow in an aircraft cabin, as compared to typical appliance water-heating systems and air chilling systems typically and previously found on passenger aircraft.

According to present aspects, "spent" air that has warmed at an air chiller condenser and that is directed in the chilled air circuit through the air chiller condenser exhaust contains "waste heat" from the chilled air circuit that is brought into contact with the potable water circuit at a heat exchanger, with the "waste heat" transferred into the potable water flow in the potable water circuit. The temperature of the potable water circuit that "absorbs" this "waste heat" can increase the temperature of potable water flow in the potable water circuit from an ambient potable water supply temperature that can (at least during certain flight phases that include taxi, takeoff, and in-flight flight phases) range from about 35° F. to about 77° F. to a warmer average temperature of a "pre-warmed" potable warmed water flow ranging from about 110° F. to about 165° F.

Present aspects are directed to the efficient redirection, re-purposing, modification, and scavenging of waste heat from a chilled air circuit into a potable water flow of a potable water circuit, including from a potable water supply and system already present in an aircraft into a new potable water circuit for at least one intended purpose of providing a pre-heated potable water flow to an aircraft galley appliance water heater that can be in the form of a at least one of beverage maker (e.g., a coffee maker and/or a water boiler), and/or a steam oven.

According to present aspects, the advantageous present creation of the thermal delta in the aircraft potable water supply to transfer absorbed waste heat (e.g., waste heat from a chilled air circuit via a heat exchanger in close proximity to an air chiller exhaust) can significantly decrease existing aircraft water heating appliance energy demand (e.g., power draw), including, for example, decreasing overall aircraft power consumption, obviating or reducing the size of water heating apparatuses in water-heating appliances, reducing the footprint/size characteristics of water heating units, and reducing power consumption demands of such heating units, etc., by delivering a "pre-warmed" potable water flow to the water heating units. The reduced water-heating appliance power demands and the reduced overall aircraft power consumption demands (e.g., from batteries, APUs, etc.) can result in a significant reduction in the overall weight of an aircraft, resulting in significant decreases operating cost, and a significant increase in efficiency that can result in the increase in sustainability and decrease in an environmental footprint of an aircraft.

In addition, present aspects employ a safe, modified augmented cooling of a chilled air circuit cooling system that can more efficiently cool and/or chill aircraft food cart/galley cart contents, etc., to produce enhanced cooling of aircraft food cart/galley cart and galley cart compartment contents, etc., with present systems obviating cooling systems that can employ ammonia or other potentially toxic compounds.

FIG. 1 is a perspective view of a vehicle in the form of an aircraft 10 including a fuselage 12, and containing and otherwise including an aircraft cabin 14 within fuselage 12. FIG. 2 is an overhead plan view of the aircraft cabin 14 within an aircraft of the type shown in FIG. 1 as aircraft 10. As shown in FIG. 2, a galley region 16 can include one or more aircraft galley hot water heaters 17 that can be integral with, for example, an aircraft galley appliance 18 18, and/or one or more galley cart compartments 20, etc., that are located within galley region 16.

Present aspects are directed the redirection and recapture of "waste heat" from a chilled air unit condenser and a chilled air unit condenser exhaust of a chilled air circuit and using the pre-warmed potable water flow as a pre-heating medium in a potable water circuit downstream from at least one heat exchanger, with the "pre-warmed" potable water flow directed from the heat exchanger in a potable water pathway to an aircraft galley appliance water heater.

According to present aspects, a potable water circuit is established and configured within an aircraft, with the potable water circuit in communication with a cool (e,g., a cooler than ambient temperature) aircraft potable water supply and/or with the potable water circuit further in communication with existing potable water circuits in an aircraft.

FIGS. 3A, 3B, and 3C are illustrations of non-exhaustive representations of an aircraft water heating appliance 50 (referred to equivalently herein as an "aircraft galley water heating appliance") that employ a flow of potable water to be heated by the appliance water heater. FIG. 3A illustrates an aircraft beverage maker in the form of a coffee maker 52. FIG. 3B illustrates an aircraft beverage maker in the form of a water boiler 54 (also referred to herein as a "hot water heater" 54. FIG. 3C illustrates a steam oven 56 that can be placed in communication with present systems. According to present aspects, the aircraft water heating appliance 50 can comprise an integral or otherwise integrated water heating apparatus, with the water heating appliance 50 further in communication with the present potable pre-warmed water flow (referred to equivalently herein as a "potable preheated water flow" and/or a "potable heated water flow" and/or a "potable warmed water flow") that is directed to the water heating appliance from a potable water source (referred to equivalently herein as a "potable water supply"), not shown in FIGS. 3A, 3B, 3C.

According to present aspects, a potable water flow is "warmed" by the potable water flow absorbing amounts of waste heat from the chilled air circuit at a heat exchanger to form a potable warmed water flow, and with the potable warmed water flow directed to the water heating appliance via a warmed water line that extends from and that is otherwise in communication with a potable water circuit. The warmed water line is configured to deliver potable warmed water (referred to equivalently herein as "pre-heated potable water") via a potable warmed water line (referred to equivalently herein as "pre-heated potable water line"), with the "pre-heated" potable water line in communication with a potable water circuit and with the "pre-heated" potable water line further in communication with the water heating appliance.

According to present aspects, FIG. 4 is a diagram of a general present system layout for a present system 100 comprising a chilled air circuit 30 (shown in FIG. 4 as an incomplete chilled air circuit) interfacing with a potable water circuit 40 (shown in FIG. 4 as an incomplete potable water circuit). In system 100, a portion of a chilled air circuit 30 that can be a chilled air circuit in an aircraft is shown comprising an air chiller unit 32 that further comprises air chiller unit components including an evaporator 34, a compressor 36, a condenser 38, and an expansion valve 40. In operation, as ambient air is provided to the evaporator side (at evaporator inlet 34*a*) and the condenser side (at condenser ambient air inlet 38*a*) of the air chiller unit 32, a closed refrigeration cycle 33 is formed within air chiller unit 32 to form a continuously cooling air flow 35 that can proceed from the evaporator cooled air outlet 34*b* of evaporator 34 into further regions of the chilled air circuit (not shown in FIG. 4) or released into a surrounding environment that can be, for example, a passenger cabin of an aircraft.

As further shown in FIG. 4, ambient temperature air is admitted to condenser 38 at condenser air intake 38*a*, with the ambient air warmed at the condenser, and released as a warmed air flow from condenser exhaust 38*b* at the condenser side of the air chiller unit 32. The warmed air flow from the condenser exhaust 38*b* can have a temperature ranging from about 128° F. to about 166° F. and, as shown in FIG. 4, is then directed to heat exchanger air intake 46*c* of heat exchanger 46.

As further shown in FIG. 4, potable water circuit 40 (referred to equivalently herein as potable water pathway 40) is shown incompletely in FIG. 4 with a volume of potable water supply 41 having an initial potable water temperature (that can be, e.g., ambient potable water temperature ranging from about 35° F. to about 77°) directed from potable water supply vessel 42 along potable water circuit line 43 to the heat exchanger potable water inlet 46*a* of heat exchanger 46. At and within heat exchanger 46, the chilled air circuit and the potable water circuit interface and undergo a heat exchange with the cool ambient potable water absorbing heat from the warm condenser exhaust air; with the warmer condenser exhaust air cooled to a lower air temperature in the heat exchanger, and with the cooler potable water heated to a higher potable water temperature that, in one present example ranges from about 110° F. to about 165° F.

According to present aspects, the heat exchanger air intake is placed in close proximity to the air chiller condenser (exhaust) outlet for the purpose of introducing air chiller condenser warm/hot air exhaust at the highest possible temperature such that the greatest heat transfer from hot air (e.g., the condenser exhaust) to the cool/ambient temperature potable water is effected within the heat exchanger. In one present example, the heat exchanger air intake can comprise a manifold that is placed in contact with the condenser outlet and through which condenser hot exhaust air can proceed into the heat exchanger air intake.

The warmed potable water flow 47 (referred to equivalently as the "pre-warmed" potable water flow 47) exiting the heat exchanger potable water outlet 46*b* is directed and otherwise continues along the potable water circuit 40 in the potable water circuit line 43 to the aircraft galley appliance water heater 17 that is shown in communication with aircraft galley appliance 18. According to further present aspects, although not shown in FIG. 4, the aircraft galley appliance 18 can incorporate integrally and otherwise integrate the aircraft galley appliance water heater into and within the aircraft galley appliance structure.

That is, as shown in FIG. 4, thermal energy is absorbed from the airflow (e.g., air circuit) by the potable water flow in the heat exchanger with the resultant air flow exiting the heat exchanger being cooler than the incoming air flow (into the heat exchanger), and with the potable water flow exiting the heat exchanger being warmer than the temperature of the cool potable water flow entering the heat exchanger. In this way, according to system 100, waste heat from air flow from a chilled air circuit is captured by the potable water flow, with the now warmer potable water flow directed, as needed, from the heat exchanger as a "pre-warmed" potable water flow (e.g., as a potable warmed water flow), to an aircraft galley water heating appliance.

FIG. 5, is a representative partially exposed view of a heat exchanger 46 of the type that can be incorporated into the present circuits, pathways, systems, and methods described herein, and according to present aspects, with the understanding that pathway and inlet and outlet locations can vary to accommodate selected positioning of circuit lines for selected systems, etc. As shown in FIG. 5, according to present aspects, the cool potable water flow from the potable water circuit 40 is introduced into heat exchanger 46 (at heat exchanger potable water inlet 46*a*) and otherwise enters into and passes through the heat exchanger 46 and exits the heat exchanger 46 from the heat exchanger potable water outlet 46*b* at a significantly higher "pre-warmed" potable water flow temperature as compared to the cooler/ambient potable water flow temperature entering the heat exchanger.

The cool potable water flow introduced to the heat exchanger encounters the high temperature air chiller condenser exhaust airflow in the heat exchanger, which transfers heat energy to the potable water flow to form the higher temperature "pre-warmed" potable water flow as the air chiller condenser hot exhaust airflow is concurrently cooled within the heat exchanger to a lower temperature. As further shown in FIG. 5, the airflow entry into the heat exchanger is represented by the large, shaded arrow entering heat exchanger air intake 46*c*, and the "cooler" airflow exiting from the heat exchanger at the heat exchanger air outlet 46*d* represented by the large, unshaded arrow. The cooler/ambient potable water flow is shown in FIG. 5 as the smaller unshaded arrow entering the heat exchanger 46 at the heat exchanger potable water inlet 46*a*, and exiting the heat exchanger via the heat exchanger potable water outlet 46*b* as the "pre-warmed" potable water flow, and shown as the smaller shaded arrow.

As stated herein. in one present example, the heat exchanger air intake can comprise a manifold (not shown in FIG. 5 and that can attach to the flanged shown at heat exchanger air intake 46*c* of heat exchanger 46). that is placed in contact with the condenser outlet and through which condenser hot exhaust air can proceed into the heat exchanger air intake 46*c*.

According to present aspects, the ability to scavenge, absorb, and otherwise repurpose waste heat from an air chiller circuit to pre-heat a potable water flow, and deliver that pre-heated potable water flow to an aircraft galley appliance water heater significantly improves the heating efficiency of the appliance water heaters by significantly reducing the electrical power otherwise needed to heat an ambient temperature water flow (ranging in temperature from about 35° F. to about 77° F. to a desired and selected "hot" water having a useful hot beverage-making temperature and food heating temperature approaching about 196° F.

In one present example, the temperature increase of a potable water flow from an initial (e.g., ambient) potable water temperature of 50° F. when the potable water flow rate is adjusted to a flow rate of 0.2 gallons per minute through the heat exchanger, can be increased to a "pre-warmed" potable water flow temperature exiting the heat exchanger of 152.5° F.; a temperature increase of 102.5° F.

FIGS. 6 and 7 are system diagrams showing present systems 200 and 300, respectively, that further illustrate present aspects, including further explanations and illustrations of types of present systems generally embraced by system 100 (as shown in FIG. 4). That is, FIG. 6 illustrates a present system 200 that can be a "closed" system of the type of system 100 shown in FIG. 4; and with FIG. 7*illustrating* a present system 300 that can be an "open" system of the type of system 100 shown in FIG. 4.

As shown in FIG. 6, system 200 comprises a chilled air circuit 30 (shown in FIG. 6 as an incomplete chilled air circuit) interfacing with a potable water circuit 40. According to present aspects, the potable water "circuit" 40 refers to a "circuit" that, in certain present systems, may not be a complete, recirculating "circuit", and instead potable water "circuit" 40 is defined herein as being a term that connotes, otherwise refers to, and that can be either a recirculating circuit and that can also be a potable water flow path or pathway that may not be a completed and/or recirculating "circuit".

As shown in FIG. 6, in system 200, a portion of a chilled air circuit 30 that can be a chilled air circuit in an aircraft is shown comprising an air chiller unit 32 that further comprises air chiller unit components of the type shown in FIG. 4 and, according to present examples, including an evaporator 34, a compressor 36, a condenser 38, and an expansion valve 39. In operation, ambient air is provided to the air chiller unit 32, and in the chilled air circuit 30 a warmed airflow is expelled from the condenser exhaust "side" of the condenser as a condenser warmed air flow 38*c* that is directly presented into heat exchanger 46 via heat exchanger air intake 46*c* that can be of the type of heat exchanger shown in FIG. 5 and as described herein.

System 200 further comprises a potable water circuit 40 (referred to equivalently herein as a "potable water pathway 40") comprising a "cool" or ambient potable water supply 41 contained within a potable water supply vessel 42 configured to dispense a selected volume of potable water supply along a potable water supply line 43 to a pump 44 comprising a pump inlet 44*a*, with pump drainage valve 45 in communication with drainage port 49 that is shown in communication with a drainage line 49*a*. In operation, pump 44 is engaged to draw or otherwise "pump" a selected volume of potable water supply from the potable water supply vessel 42 into pump 44 at pump inlet 44*a* and out from pump 44 at pump outlet 44*b*. In one example the ambient potable water supply flow is a cooler potable water flow ranging in temperature from about 35° F. to about 77° F. The ambient potable water flow proceeds from pump 44 toward and into heat exchanger potable water inlet 46*a* of heat exchanger 46.

According to present aspects, the heat exchanger air intake is placed in close proximity to the air chiller condenser exhaust outlet for the purpose of introducing air chiller unit condenser warm/hot air exhaust at the highest possible temperature, such that the greatest heat transfer from hot air (e.g., the condenser exhaust) to the cool/ambient temperature potable water is effected within the heat exchanger. In one present example, the heat exchanger air intake can comprise a manifold that is placed in contact with the condenser outlet and through which condenser hot exhaust air can proceed into the heat exchanger air intake. In a present example, the condenser exhaust is connected directly to the heat exchanger air intake to advantageously conserve the thermal energy in the "hot" air expelled from the condenser exhaust.

The warmed potable water flow 47 (referred to equivalently as the "pre-warmed" potable water flow 47) exits the heat exchanger potable water outlet 46*b* and is directed and otherwise continues along the potable water circuit 40 in the "pre-warmed" potable water circuit line 43*a* to the aircraft galley appliance water heater 17 that is shown in communication with aircraft galley appliance 18 and that can be contained integrally within the aircraft galley appliance 18. In a present example, the "pre-warmed" potable water flow 47 is heated at the heat exchanger, and proceeds within the "pre-warmed" potable water line 43*a* and into the aircraft galley appliance water heater at a temperature ranging from about 110° F. to about 165° F.

In addition to supplying an aircraft galley appliance water heater with a selected volume of "pre-warmed" potable water, system 200 can further direct a volume of pre-warmed potable water to a pre-warmed potable water storage vessel 142 configured to contain, dispense, and to store, a volume of "pre-warmed" potable water 141.

In a present example, system 200 can be engaged to fill, maintain, and/or store, a volume of pre-warmed potable water within a pre-warmed potable water storage vessel that can be and that can form a "pre-warmed" potable water reserve, even when there is not a commensurate demand for a volume of "pre-warmed" potable water at the aircraft galley appliance. In addition, system 200 can simultaneously deliver a "pre-warmed" potable water flow to both an aircraft galley appliance water heater and the pre-warmed potable water storage vessel. In another present example, the pre-warmed potable storage vessel can be bypassed, with the pre-warmed potable waterflow directed solely to the aircraft gally appliance water heater, and with no selected volume of "pre-warmed" potable water flow directed into the pre-warmed potable water storage vessel.

System 200, as shown in FIG. 6 and according to present aspects, depicts a "closed" potable water flow, where a selected volume of potable can be directed from (e.g., “pumped”) from the potable water storage vessel 42, with a pump and with the storage vessel 42 comprising valving that allows for and otherwise facilitates the “one-way” potable water flow out from the storage vessel 42, and with no water admitted back into the storage vessel 42 in the potable water circuit 40.

In contrast to the “closed” system presented by present system 200, FIG. 7 shows another present aspect of a system 300 that is a system configuration generally embraced by system 100 as shown in FIG. 4. System 300, as shown in FIG. 7 depicts an “open” system that is configured to take advantage of a thermal exchange to “pre-warm” a potable water flow in a fashion similar to that described for “closed” system 200 (shown in FIG. 6) with the notable system configuration difference placing system 300 into an “open” configuration such that a selected volume of “pre-warmed” potable water flow can be directed back into the potable water supply vessel 42.

According to system 300, that is an “open” system, pump 44 comprises the valving necessary to both: 1) direct a flow of ambient temperature potable water into the potable water circuit 40 to form a “pre-warmed” potable water flow that is directed to an aircraft galley appliance water heater; and 2) direct a selected volume of “pre-warmed” potable water flow 47 from a “pre-warmed” potable water flow line 43*a* back into the ambient potable water supply vessel 42 at potable water supply vessel inlet 42*a*. In operation, system 300 operates similarly to system 200, and additionally can comprise a valve 145*a* positioned in pre-warmed potable water line 43*a* downstream from the heat exchanger 46 to selectively direct the pre-warmed potable water flow toward valve 145*b*. Valve 145*b* can be positioned to direct the pre-warmed potable water flow in the potable water circuit 40 to either: 1) the pre-warmed potable water storage vessel 142; and/or 2) the (ambient) potable water supply vessel 42. In addition, as shown in FIG. 7, in system 300, the “pre-warmed” potable water flow 47 can be directed by valves 145*a*, 145*c* that can be positioned to direct the “pre-warmed” potable water flow directly to the aircraft galley appliance water heater 17 that can be integrated with aircraft galley appliance 18 (as shown in FIG. 7), or that can be otherwise in communication with (and not integrated into) aircraft galley appliance 18 (not shown in FIG. 7).

In another present aspect, a potable water flow from an ambient/cool potable water supply can be “pre-warmed” (and otherwise absorb heat) and then “further pre-warmed” in a potable water circuit through a thermal exchange at more than one heat exchanger, with hot air expelled from an air chiller condenser exhaust (e.g., of an air chiller unit in an aircraft air chiller circuit), to a (second) heat exchanger positioned proximate to the exhaust side of the air chiller unit condenser, as described herein in connection with systems 100, 200, and 300. In addition, in a present example, highly efficient “pre-warmed” potable water systems are described that position and otherwise comprise an additional (first) heat exchanger positioned in the system upstream of the air chiller unit to deliver a cooler than ambient air flow to an air chiller condenser intake (e.g., condenser intake “side” to increase the efficiency of the air chilling circuit), with the additional (first) heat exchanger configured to receive ambient air flow that is warmer than a cool potable water flow from a potable water supply, such that the potable water is first at least slightly “warmed” (referred to equivalently herein as “pre-warmed”) at the first heat exchanger, and the at least slightly warmed potable water flow exiting the first heat exchanger is directed to a second heat exchanger (and as described herein in systems 100, 200, 300 as the only heat exchanger), where the slightly warmed or “pre-warmed” potable water flow in systems 400, 500, and 600 is “further pre-warmed” at the second heat exchanger and then is directed to an aircraft appliance water heater, further increasing the system efficiency of the aircraft appliance water heating function via such a system.

According to present aspects, FIG. 8 is a diagram of a general present system layout for a present system 400 comprising a chilled air circuit 30 of the type also shown in FIGS. 4 and 6 (and shown in FIG. 8 as an incomplete chilled air circuit) interfacing with a potable water circuit 40 (shown in FIG. 8 as an incomplete potable water circuit). In system 400, a portion of a chilled air circuit 30 that can be a chilled air circuit in an aircraft is shown comprising an air chiller unit 32 that further comprises comprising air chiller unit components including an evaporator 34, a compressor 36, a condenser 38, and an expansion valve 40. In operation, as ambient air is provided to the evaporator side (at evaporator inlet 34*a*) and the condenser side (at condenser ambient air inlet 38*a*) of the air chiller unit 32, a closed refrigeration loop 33 is formed within air chiller unit 32 to formed a continuously cooling air flow 35 that can proceed from the evaporator cooled air outlet 34*b* of evaporator 34 into further regions of the chilled air circuit (not shown in FIG. 8) or released into a surrounding environment that can be, for example, a passenger cabin of an aircraft.

In system 400, at and within “first” heat exchanger 146 (that is positioned in the potable water flow circuit and positioned upstream of the air chiller unit 32), the chilled air circuit 30 and the potable water circuit 40 interface for a first time, and undergo a heat exchange where the cool ambient potable water absorbs heat from the warmer temperature ambient air (e.g., warmer temperature ambient air having a higher temperature than and being warmer than the cooler ambient potable water supply 41 contained in the potable water supply vessel 42) and the warmer ambient releases heat to the potable water flow, and the warmer ambient air is cooled at the first heat exchanger 146. The cooler potable water introduced to the first heat exchanger potable water inlet 146*a* is at least slightly heated in the first heat exchanger 146, and exits the first heat exchanger 146 at an increased temperature as compared to the temperature of the ambient potable water supply 41 entering the first heat exchanger 146.

As further shown in FIG. 8, air that has been slightly cooled by the first heat exchanger (and that is slightly below ambient temperature air) is delivered from the first heat exchanger 146 and admitted to condenser 38 at condenser air intake 38*a*, warmed at the condenser, and then released as a warmed air flow from condenser exhaust 38*b* at the condenser exhaust side of the air chiller unit 32. The warmed air flow from the condenser exhaust 38*b* can have a temperature ranging from about 60° F. to about 80° F., and, as shown in FIG. 8, is directed to heat exchanger air intake 46*c* of the second heat exchanger 46.

As further shown in FIG. 8, potable water circuit 40 (referred to equivalently herein as potable water pathway 40) is shown incompletely in FIG. 8 with a volume of potable water supply 41 having an initial potable water temperature (that can be, e.g., ambient potable water temperature ranging from about 35° F. to about 77°) directed from potable water supply vessel 42 along potable water circuit line 43 to the first heat exchanger potable water inlet 146*a* of heat exchanger 146.

As shown in FIG. 8, in system 400 the “second” heat exchanger air intake 46*c* of the second heat exchanger 46 is positioned in close proximity to (and can be in direct communication with) air chiller unit condenser (heated/warmed) air flow exhaust 38*b* in system 400, is referred to as the "second" heat exchanger 46. As described herein, at least with respect to systems 100, 200, and 300, the chilled air circuit and the potable water circuit interface once in one heat exchanger. In systems 400, 500 and 600 (as shown, respectively in FIGS. 8, 9, and 10), within a "second" heat exchanger 46, the chilled air circuit and the potable water circuit interface within systems 400, 500, and 600 for a second time and undergo a second heat exchange (e.g., a thermal exchange), with the slightly warmed ambient potable water that is slightly warmed at the first heat exchanger 146 further absorbing significant heat from the warm condenser exhaust air. The slightly warmer potable water is significantly heated to a higher potable water temperature that, in one present example exits the second heat exchanger potable water outlet 46*b* of the second heat exchanger 46 at a warmer temperature (referred to equivalently herein with respect to systems 400, 500, and 600 as a "further warmed" potable water temperature) ranging from about 110° F. to about 165° F. In another present example, the "further warmed" potable water temperature) ranging from about 128° F. to about 166° F.

According to present aspects, in systems 400, 500, and 600 the second heat exchanger air intake is placed in close proximity to the air chiller condenser exhaust outlet for the purpose of introducing air chiller condenser warm/hot air exhaust to the second heat exchanger at the highest possible temperature such that the greatest heat transfer from hot air (e.g., the condenser exhaust) to the slightly warmed temperature of the slightly warmed potable water flow is effected within and at the second heat exchanger. In one present example, the second heat exchanger air intake can comprise a manifold that is placed in contact with the condenser (exhaust) outlet and through which condenser hot exhaust air can proceed into the second heat exchanger air intake. The warmed potable water flow (referred to equivalently as the "further pre-warmed" potable water flow 47*a*) exiting the second heat exchanger potable water outlet 46*b* is directed and otherwise continues along the potable water circuit 40 in the further warmed potable water circuit line 43*b* to the aircraft galley appliance water heater 17 that is shown in communication with aircraft galley appliance 18. As shown in FIG. 8, the aircraft galley appliance 18 can incorporate integrally and otherwise integrate the aircraft galley appliance water heater 17 into and within the aircraft galley appliance structure.

That is, as shown in FIGS. 8, 9, and 10, in systems 400, 500, and 600, thermal energy in the form of "heat" is absorbed twice by the potable water in the potable water circuit from the air chiller circuit airflow via two heat exchangers. The ambient potable water supply is first slightly heated at the first heat exchanger to form a slightly heated potable water flow (referred to equivalently herein at least for purposes of describing systems 400, 500, and 600 as a "pre-warmed" potable water flow) that is then "further" heated at the second heat exchanger to form a "further pre-warmed" potable water flow. In this way, according to systems 400, 500, and 600 waste heat from air flow is captured twice by the potable water flow, with the "further pre-warmed" potable water flow directed, as needed, and on demand from the second heat exchanger as the "further pre-warmed" potable water flow to an aircraft galley water heating appliance at a "further pre-warmed" potable water flow temperature ranging from about 110° F. to about 165° F. In another present example, the further warmed" potable water temperature ranges from about 128° F. to about 166° F.

While the "pre-warmed" potable water flow temperature range of systems 100, 200 and 300 can be the same as the "further pre-warmed" potable water flow temperature range, according to present aspects, the warming and further warming of the potable water flow achieved in systems 400, 500, and 600 can be accomplished at an increased efficiency while further reducing the power draw (even as compared to the power draw reduction achieved in systems 100, 200, 300) required to dispense potable hot water from an aircraft potable water heating appliance at a temperature approaching about 196° F.

FIGS. 9 and 10 are system diagrams showing present systems 500 and 600, respectively, that further illustrate present aspects, including further explanations and illustrations of types of present systems generally embraced by system 400 (as shown in FIG. 8). That is, FIG. 9 illustrates a present system 500 that can be an "closed" system of the type of system 400 shown generally in FIG. 8; and with FIG. 10 illustrating a present system 600 that can be an "open" system of the type of system 400 shown generally in FIG. 8.

As shown in FIG. 9, system 500 comprises a chilled air circuit 30 (shown in FIG. 9 as an incomplete chilled air circuit) interfacing with a potable water circuit 40. According to present aspects, the potable water "circuit" 40 refers to a "circuit" that, in certain present systems, may not be a complete, recirculating "circuit", and instead potable water "circuit" 40 is defined herein as being a term that connotes, otherwise refers to, and that can be either a recirculating circuit and that can also be a potable water flow path that may not be a completed and/or recirculating "circuit".

As shown in FIG. 9, in system 500, a portion of a chilled air circuit 30 that can be a chilled air circuit in an aircraft is shown comprising an air chiller unit 32 that further comprises air chiller unit components of the type shown in FIG. 8 and, according to a present example, including an evaporator 34, a compressor 36, a condenser 38, and an expansion valve 39. In operation, cooler than ambient air is provided by the first heat exchanger 146 to the air chiller unit 32, and in the chilled air circuit 30, and a significantly warmed airflow is expelled from the condenser exhaust "side" of the condenser as a condenser exhaust warmed air flow 38*c* that is directly presented into the second heat exchanger 46 via heat second exchanger air intake 46*c* that can be of the type of heat exchanger shown at least in FIGS. 5, 6, 7, and 8, and as described herein.

System 500 further comprises a potable water circuit 40 (referred to equivalently herein as a "potable water pathway 40") comprising a "cool" or ambient potable water supply 41 contained within a potable water supply vessel 42 configured to dispense a selected volume of potable water supply along a potable water supply line 43 to a pump 44 comprising a pump inlet 44*a*, pump drainage valve 45 in communication with drainage port 49 that is shown in communication with a drainage line 49*a*. In operation, pump 44 is engaged to draw or otherwise "pump" a selected volume of potable water supply from the potable water supply vessel 42 into pump 44 at pump inlet 44*a* and out from pump 44 at pump outlet 44*b*. In one example the ambient potable water supply flow is a cooler potable water flow ranging in temperature from about 35° F. to about 77° F. The ambient potable water flow proceeds from pump 44 toward and into first heat exchanger potable water inlet 146*a* of first heat exchanger 146.

According to present aspects, the second heat exchanger air intake is placed in close proximity to the air chiller condenser exhaust outlet for the purpose of introducing air chiller unit condenser warm/hot air exhaust to the second heat exchanger at the highest possible condenser air exhaust temperature, such that the greatest heat transfer from hot air (e.g., the condenser exhaust) to the slightly warmed potable water is effected within the second heat exchanger. In one present example, the heat exchanger air intake can comprise a manifold that is placed in contact with the condenser outlet and through which condenser hot exhaust air can proceed into the second heat exchanger air intake. In a present example, the condenser exhaust is connected directly to the second heat exchanger air intake to conserve the thermal energy in the "hot" air expelled from the condenser exhaust.

The slightly "pre-warmed" warmed potable water flow 47 (referred to equivalently as the "pre-warmed" potable water flow 47) exits the first heat exchanger potable water outlet 146*b* and is directed and otherwise continues along the potable water circuit 40 in the "pre-warmed" potable water circuit line 43*a* to the second heat exchanger potable water inlet 46*a* of the second heat exchanger 46. The slightly "pre-warmed" warmed potable water flow 47 is then further heated in the second heat exchanger to form the "further pre-warmed" potable water flow 47*a* that then exits the second heat exchanger potable water outlet 46*b* and is directed and otherwise continues along the potable water circuit 40 in the "further pre-warmed" potable water circuit line 43*b* to the aircraft galley appliance water heater 17 that is shown in communication with aircraft galley appliance 18 and that can be contained integrally within the aircraft galley appliance 18. In a present example, the "further pre-warmed" potable water flow 47*a* proceeds within the "further pre-warmed" potable water line 43*b* and in one example, proceeds into and is otherwise delivered to and into the aircraft galley appliance water heater at a "further pre-warmed" temperature ranging from about 110° F. to about 165° F.

In addition to supplying an aircraft galley appliance water heater with a selected volume of "further pre-warmed" potable water, system 500 can further direct a volume of further pre-warmed potable water to a further pre-warmed potable water storage vessel 142 configured to contain, dispense, and to store, a volume of "further pre-warmed" potable water 141.

In a present example, system 500 can be engaged to fill, maintain, and/or store, a volume of further pre-warmed potable water within a further pre-warmed potable water storage vessel that can be and that can form a "further pre-warmed" potable water reserve, even when there is not a commensurate demand for a volume of "further pre-warmed" potable water at the aircraft galley appliance. In addition, system 500 can simultaneously deliver a "further pre-warmed" potable water flow to both an aircraft galley appliance water heated and the further pre-warmed potable water storage vessel. In another present example, the further pre-warmed potable storage vessel can be bypassed, with the further pre-warmed potable waterflow directed solely to the aircraft gally appliance water heater, and with no selected volume of "further pre-warmed" potable water flow directed into the pre-warmed potable water storage vessel.

System 500, as shown in FIG. 9 and according to present aspects, depicts a "closed" potable water flow, where a selected volume of potable can be directed from (e.g., "pumped") from the potable water storage vessel 42, with a pump and the storage vessel 42 comprising valving that allows for and otherwise facilitates the "one-way" potable water flow out from the storage vessel 42, and with no water admitted cack into the storage vessel 42 in the potable water circuit 40.

In contrast to the "closed" system presented by present system 500 (and shown in FIG. 9), FIG. 10 shows another present aspect of a system 600 that is a system configuration generally embraced by system 400 as shown in FIG. 8. System 600, as shown in FIG. 10, depicts an "open" system that is configured to take advantage of a thermal exchange to "further pre-warm" a potable water flow in a fashion similar to that described for "closed" system 500 (shown in FIG. 9) with the notable system configuration difference placing system 600 into an "open" configuration such that a selected volume of "further pre-warmed" potable water flow can be directed back into the potable water supply vessel 42. According to system 600, that is an "open" system, pump 44 comprises the valving necessary to both: 1) direct a flow of ambient temperature potable water into the potable water circuit 40 to form a "pre-warmed" and a "further pre-warmed" potable water flow, with the "further pre-warmed" potable water flow then directed to an aircraft galley appliance water heater; and 2) direct a selected volume of "further pre-warmed" potable water flow 47*a* from a "further pre-warmed" potable water flow line 43*b* back into the ambient potable water supply vessel 42 at potable water supply vessel inlet 42*a*. In operation, system 600 operates similarly to system 500, and additionally can comprise a valve 145*a* positioned in further pre-warmed potable water line 43*b* downstream from the second heat exchanger 46 to selectively direct the further pre-warmed potable water flow toward valve 145*b*. Valve 145*b* can be positioned to direct the further pre-warmed potable water flow in the potable water circuit 40 to either: 1) the further pre-warmed potable water storage vessel 142; and/or 2) the (ambient) potable water supply vessel 42. In addition, as shown in FIG. 10, in system 600, the "further pre-warmed" potable water flow 47*a* can be directed by valves 145*a*, 145*c* positioned to direct the "further pre-warmed" potable water flow directly to the aircraft galley appliance water heater 17 that can be integrated with aircraft galley appliance 18 (as shown in FIG. 10), or that can be otherwise in communication with (and not integrated into) aircraft galley appliance 18 (not shown in FIG. 10).

According to present aspects, systems and methods are presented that significantly increase the efficiency of, and decrease the power otherwise required to most efficiently support, aircraft galley appliance hot water heating, while also reducing the power required to efficiently support an aircraft air chiller unit. That is, present aspects described herein use thermal exchanges between a cool aircraft potable water circuit and an aircraft air chilling circuit that increase the efficiency (e.g., by reducing the power draws) of both the operation of an aircraft chilling circuit and aircraft galley appliance water heating operations.

While present aspects are described herein as utilizing a repurposed heat source (e.g., and otherwise "scavenging" available and otherwise lost waste heat produced by an aircraft air chilling circuit) in the form of an air chilling unit condenser hot air exhaust as a primary heat source in a thermal exchange with a cool aircraft potable water flow circuit, further present aspects can also improve the efficiencies and reduce the power draws of both the operation of an aircraft chilling circuit and the heating operation/function of an aircraft galley appliance water heater by reclaiming, repurposing, scavenging and otherwise absorbing waste heat in an aircraft environment without using the hot air flow from a chiller condenser exhaust as the primary source of heat in a heat transfer system.

That is, according to present aspects, the positioning of a heat exchanger proximate to an air chiller exhaust can most efficiently reduce power draws and increase system efficiency of an aircraft galley appliance water heater and simultaneously reduce the power draws and increase efficiency of an aircraft air chiller circuit. In addition, according to further present aspects, power demand reduction and system efficiency for an aircraft galley appliance water heater while simultaneously reducing the power draws and increasing efficiency of an aircraft air chiller circuit can be obtained through further present systems and methods, perhaps to a lesser degree, by placing a heat exchanger at a position relative to the air chiller unit where the heat exchanger air intake is not in direct communication with the air chiller condenser exhaust. According to these further aspects, systems and methods are presented herein wherein a heat exchanger is positioned at a location on a side of an air chiller unit that is not is direct communication with an air chiller condenser exhaust of an air chiller unit in an air chilling circuit, and instead the heat exchanger is configured to admit an airflow having a slightly warmed temperature that can be both above an ambient air temperature and above an ambient potable water flow temperature. In these present aspects, the heat exchanger is said to be in only indirect communication with a heated/warmed exhaust air flow expelled from an air chiller condenser air exhaust. That is, in these present aspects, a heat exchanger delivers heat from an admitted airflow to warm a potable water flow at and within the heat exchanger, with the heat exchanger not necessarily positioned in close proximity with the hot/warm air expelled from the air chiller condenser air exhaust, and with the heat exchanger positioned to admit a warmed ambient air flow that can be warmed by the release of the condenser air exhaust into an ambient environment adjacent the heat exchanger.

According to present aspects, FIG. 11 is a diagram of a general present system layout for a present system 700 comprising a chilled air circuit 30 (shown in FIG. 11 as an incomplete chilled air circuit) interfacing with a potable water circuit 40 (shown in FIG. 11 as an incomplete potable water circuit). In system 700, a portion of a chilled air circuit 30 that can, for example, be a chilled air circuit in an aircraft is shown comprising an air chiller unit 32 that further comprises comprising air chiller unit components including an evaporator 34, a compressor 36, a condenser 38, and an expansion valve 39. In operation, as ambient air is provided to the evaporator side (at evaporator inlet 34*a* and the condenser side (at condenser ambient air inlet 38*a*) of the air chiller unit 32, a closed refrigeration loop is formed within air chiller unit 32 to formed a continuously cooling air flow 35 that can proceed from the evaporator cooled air outlet 34*b* of evaporator 34 into further regions of the chilled air circuit (not shown in FIG. 11) or released into a surrounding environment that can be, for example, a passenger cabin of an aircraft.

As further shown in FIG. 11, a flow of ambient temperature air that can include slightly warmer than ambient temperature air in an aircraft environment is directed to exchanger 46 and is admitted at heat exchanger air intake 46*c*. As further shown in FIG. 11, potable water circuit 40 (referred to equivalently herein as potable water pathway 40) is shown incompletely in FIG. 4 with a volume of potable water supply 41 having an initial potable water temperature (that can be, e.g., ambient potable water temperature ranging from about 35° F. to about 77° F.) directed from potable water supply vessel 42 along potable water circuit line 43 (shown in FIGS. 13, 14) to the heat exchanger potable water inlet 46*a* of heat exchanger 46. At and within heat exchanger 46, the chilled air circuit and the potable water circuit interface and undergo a heat exchange with the cool ambient water absorbing heat from the "slightly" warmer ambient air (e.g., the ambient air is at a "warmer" temperature than the cool potable water flow) existing at a region adjacent to the heat exchanger air intake, and with the warmer ambient air cooled to a lower air temperature in the heat exchanger (by the potable water flow), and the cooler potable water heated to a higher potable water temperature.

As shown in FIG. 11, during operation of the air chilling circuit, at the condenser, warmed air can be released into the environment outside of the air chiller unit by the condenser exhaust and released as a warmed air flow (exhaust air) from condenser exhaust 38*b* at the condenser side of the air chiller unit 32. The warmed air flow from the condenser exhaust 38*b* can have a temperature ranging from about 128° F. to about 166° F., and as shown in FIG. 11 is directed out from the air chiller unit 32 into a surrounding environment that is not in direct communication with heat exchanger 46.

According to present aspects, the heat exchanger air intake is not placed in close proximity to the air chiller condenser outlet for the purpose of introducing air chiller condenser warm/hot air exhaust at the highest possible temperature such that the greatest heat transfer from hot air (e.g., the condenser exhaust) to the cool/ambient temperature potable water is effected within the heat exchanger. The warmed potable water flow (referred to equivalently as the "pre-warmed" potable water flow 47 and shown in FIGS. 12, 13) exiting the heat exchanger potable water outlet 46*b* is directed and otherwise continues along the potable water circuit 40 in the potable water circuit line 43*s* to the aircraft galley appliance water heater 17 that is shown in communication with aircraft galley appliance 18. According to further present aspects, as shown in FIG. 11, the aircraft galley appliance 18 can incorporate integrally and otherwise integrate the aircraft galley appliance water heater 17 into and within the aircraft galley appliance 18 structure.

That is, as shown in FIG. 11, thermal energy is absorbed by the potable water flow in the heat exchanger from the airflow introduced to the heat exchanger (e.g., warmer air from the air circuit) with the resultant air flow exiting the heat exchanger being cooler than the incoming air flow (into the heat exchanger), and with the potable water flow exiting the heat exchanger being warmer than the temperature of the cool potable water flow entering the heat exchanger. In this way, according to system 700, waste heat from air flow is captured by the potable water flow, with the now warmer potable water flow directed as needed, and directed from the heat exchanger as a "pre-warmed" potable water flow (e.g., as a potable warmed water flow), to an aircraft galley water heating appliance.

FIGS. 12 and 13 are system diagrams showing present systems 800 and 900, respectively, that further illustrate present aspects, including further explanations and illustrations of types of present systems generally embraced by system 700 (as shown in FIG. 11). That is, FIG. 12 illustrates a present system 800 that can be an "closed" system of the type of system 700 shown in FIG. 4; and with FIG. 13 illustrating a present system 900 that can be an "open" system of the type of system 700 shown in FIG. 12.

As shown in FIG. 13, system 800 comprises a chilled air circuit 30 (shown in FIG. 13 as an incomplete chilled air circuit) interfacing with a potable water circuit 40. According to present aspects, the potable water "circuit" 40 refers to a "circuit" that, in certain present systems, may not be a complete, recirculating "circuit", and instead potable water "circuit" 40 is defined herein as being a term that connotes, otherwise refers to, and that can be either a recirculating circuit and that can also be a potable water flow path that may not be a completed and/or recirculating "circuit".

As shown in FIG. 12, in system 800, a portion of a chilled air circuit 30 that can be a chilled air circuit in an aircraft is shown comprising an air chiller unit 32 that further comprises air chiller unit components of the type shown in FIG. 11 and, according to a present example, including an evaporator 34, a compressor 36, a condenser 38, and an expansion valve 39. In operation, ambient air is provided to the air chiller unit 32, and in the chilled air circuit 30 a warmed airflow is expelled from the condenser exhaust "side" of the condenser as a condenser warmed air flow 38*c* that, as shown in FIGS. 11, 12, and 13 is not directly presented into heat exchanger 46 via heat exchanger air intake 46*c* (e.g., that can be of the type of heat exchanger shown in FIG. 5 and as described herein), and instead the warmed air flow from the condenser exhaust may cool to become a warmed ambient airflow having a temperature that is lower than the airflow temperature from the heated air flow released from and at the condenser exhaust, and warmer than ambient air and warmer than the cool potable water flow in the potable water flow circuit.

That is, system 800 further comprises a potable water circuit 40 (referred to equivalently herein as a "potable water pathway 40") comprising a "cool" or ambient potable water supply 41 contained within a potable water supply vessel 42 configured to dispense a selected volume of potable water supply along a potable water supply line 43 to a pump 44 comprising a pump inlet 44*a*, pump drainage valve 45 in communication with drainage port 49 that is shown in communication with a drainage line 49*a*. In operation, pump 44 is engaged to draw or otherwise "pump" a selected volume of potable water supply from the potable water supply vessel 42 into pump 44 at pump inlet 44*a* and out from pump 44 at pump outlet 44*b*. In one example the ambient potable water supply flow is a cooler potable water flow ranging in temperature from about 35° F. to about 77° F. The ambient potable water flow proceeds from pump 44 toward and into heat exchanger potable water inlet 46*a* of heat exchanger 46.

According to present aspects, the heat exchanger air intake is not placed in close proximity to the air chiller condenser exhaust outlet. Instead, the heat exchanger 46 (at the heat exchanger air intake 46*c*) receives an ambient air flow that can be a "slightly" warmed airflow for the purpose of introducing a warmer ambient airflow that will not be at the highest possible temperature of air produced by the air chiller circuit, and the warmed ambient air flow will transfer an amount of heat to the cool/ambient temperature potable water within the heat exchanger.

The warmed potable water flow 47 (referred to equivalently as the "pre-warmed" potable water flow 47) exits the heat exchanger potable water outlet 46*b* and is directed and otherwise continues along the potable water circuit 40 in the "pre-warmed" potable water circuit line 43*a* to the aircraft galley appliance water heater 17 that is shown in communication with aircraft galley appliance 18 and that can be contained integrally within the aircraft galley appliance 18. In a present example, the "pre-warmed" potable water flow 47 is heated at the heat exchanger, and proceeds within the "pre-warmed" potable water line 43*a* and into the aircraft galley appliance water heater at a temperature ranging from about 110° F. to about 165° F.

In addition to supplying an aircraft galley appliance water heater with a selected volume of "pre-warmed" potable water, system 800 can further direct a volume of pre-warmed potable water to a pre-warmed potable water storage vessel 142 configured to contain, dispense, and to store, a volume of "pre-warmed potable water 141.

In a present example, system 800 can be engaged to fill, maintain, and/or store, a volume of pre-warmed potable water within a pre-warmed potable water storage vessel that can be and that can form a "pre-warmed" potable water reserve, even when there is not a commensurate demand for a volume of "pre-warmed" potable water at the aircraft galley appliance. In addition, system 800 can simultaneously deliver a "pre-warmed" potable water flow to both an aircraft galley appliance water heated and the pre-warmed potable water storage vessel. In another present example, the pre-warmed potable storage vessel can be bypassed, with the pre-warmed potable waterflow directed solely to the aircraft gally appliance water heater, and with no selected volume of "pre-warmed" potable water flow directed into the pre-warmed potable water storage vessel.

System 800, as shown in FIG. 12 and according to present aspects, depicts a "closed" potable water flow, where a selected volume of potable can be directed from (e.g., "pumped") from the potable water storage vessel 42, with a pump and the storage vessel 42 comprising valving that allows for and otherwise facilitates the "one-way" potable water flow out from the storage vessel 42, and with no water admitted cack into the storage vessel 42 in the potable water circuit 40.

In contrast to the "closed" system presented by present system 800 (and shown in FIG. 12, FIG. 13 shows another present aspect of a system 900 that is a system configuration generally embraced by system 700 as shown in FIG. 11. System 900, as shown in FIG. 13 depicts an "open" system that is configured to take advantage of a thermal exchange to "pre-warm" a potable water flow in a fashion similar to that described for "closed" system 800 (shown in FIG. 12) with the notable system configuration difference placing system 900 into an "open" configuration such that a selected volume of "pre-warmed" potable water flow can be directed back into the potable water supply vessel 42. According to system 900, that is an "open" system, pump 44 comprises the valving necessary to both: 1) direct a flow of ambient temperature potable water into the potable water circuit 40 to form a "pre-warmed" potable water flow that is directed to an aircraft galley appliance water heater; and 2) direct a selected volume of "pre-warmed" potable water flow 47 from a "pre-warmed" potable water flow line 43*a* back into the ambient potable water supply vessel 42 at potable water supply vessel inlet 42*a*.

In operation, system 900 operates similarly to system 800, and additionally can comprise a valve 145*a* positioned in pre-warmed potable water line 43*a* downstream from the heat exchanger 46 to selectively direct the pre-warmed potable water flow toward valve 145*b*. Valve 145*b* can be positioned to direct the pre-warmed potable water flow in the potable water circuit 40 to either: 1) the pre-warmed potable water storage vessel 142; and/or 2) the (ambient) potable water supply vessel 42. In addition, as shown in FIG. 13, in system 900, the "pre-warmed" potable water flow 47 can be directed by valves 145*a*, 145*c* positioned to direct the "pre-warmed" potable water flow directly to the aircraft galley appliance water heater 17 that can be integrated with aircraft galley appliance 18 (as shown in FIG. 12), or that can be otherwise in communication with (and not integrated into) aircraft galley appliance 18 (not shown in FIG. 13).

FIGS. 14, 15, 16, 17, 18, 19, 20, 21, 22, 23, 24, and 25 are flowcharts outlining present methods according to present aspects.

As shown in FIG. 14, a method 1000 for decreasing electrical energy demand in an operating aircraft galley appliance water heater and concurrently decreasing electrical energy demand in an operating air chiller, with the method 1000 comprising directing 1002 a potable water flow from a potable water supply into a potable water circuit. The method further comprises directing 1004 the potable water flow into a heat exchanger potable water inlet of a heat exchanger, with the heat exchanger positioned proximate to, (e.g., in close proximity to) and downstream from an air chiller condenser, with the heat exchanger comprising a heat exchanger warmed air intake and a heat exchanger air outlet, and with the heat exchanger further comprising a heat exchanger pre-warmed potable water flow outlet. The method 1000 further comprises directing 1006 a warmed airflow from an air chiller condenser exhaust directly into the heat exchanger warmed air intake, with the warmed airflow having a warmed air temperature higher that the initial potable water flow temperature, and forming 1008 a pre-warmed potable water flow at the heat exchanger, with the pre-warmed potable water flow comprising a pre-warmed potable water flow temperature higher than the initial potable water flow temperature. The method further comprises directing 1010 the pre-warmed potable water flow to the aircraft galley appliance water heater.

In another present aspect, in the method 1000 for decreasing electrical energy demand in an operating aircraft galley appliance water heater, the method 1000 further includes concurrently decreasing electrical energy demand in an operating air chiller.

In a present example, pre-warmed potable water flow at the heat exchanger has a temperature ranging from about 110° F. to about 165° F. In another present aspect, pre-warmed potable water flow at the heat exchanger has a temperature ranging from about 128° F. to about 166° F.

FIG. 15 is a flowchart outlining another present aspect, wherein a method 1100 comprises the elements presented and described in method 1000, and with method 1100 as shown in FIG. 15 further comprising directing 1102 a portion of the pre-warmed potable water flow to a pre-warmed potable water storage vessel.

FIG. 16 is a flowchart outlining another present aspect, wherein a method 1200 comprises the elements presented and described in method 1100, and with method 1200 as shown in FIG. 16 further comprising directing 1202 a portion of the pre-warmed potable water flow from the pre-warmed potable water storage vessel to the aircraft galley appliance water heater.

FIG. 17 is a flowchart outlining another present aspect, wherein a method 1300 comprises the elements presented and described in method 1000, and with method 1300 as shown in FIG. 17 further comprising directing 1302 a portion of the pre-warmed potable water flow "back" into the potable water supply from the pre-warmed potable water storage vessel with the potable water pathway configured to be a potable water open circuit.

In another present aspect the aircraft galley appliance is at least one of an aircraft galley coffee maker, an aircraft galley water boiler, or an aircraft galley steam oven.

According to another present aspect as shown in FIG. 18, a method 1400 for decreasing electrical energy demand in an operating aircraft galley appliance water heater is disclosed, with the method 1400 comprising directing 1402 a potable water flow having an initial potable water flow temperature into a potable water circuit from a potable water supply to a first heat exchanger potable water inlet of a first heat exchanger, with the heat exchanger positioned proximate to and upstream from an air chiller condenser. The heat exchanger further comprises a heat exchanger air intake, a heat exchanger air outlet, and a first heat exchanger potable water flow outlet. The method 1400 further comprises forming 1404 a pre-warmed potable water flow in the first heat exchanger, with the pre-warmed potable water flow having a pre-warmed potable water flow temperature and directing 1406 the pre-warmed potable water flow from the first heat exchanger potable water flow outlet to a second heat exchanger potable water inlet of a second heat exchanger, with the second heat exchanger positioned proximate to the air chiller, with the second heat exchanger further positioned to receive warmed air from an air chiller condenser exhaust. The second heat exchanger further comprises a second heat exchanger warmed air intake and a second heat exchanger air outlet, with the second heat exchanger further comprising a second heat exchanger potable water flow outlet. The method 1400 further comprises directing 1408 a warmed airflow from an air chiller condenser exhaust into the second heat exchanger warmed air intake, with the warmed airflow having a warmed air temperature higher that the pre-warmed potable water flow temperature and forming 1410 a "further pre-warmed" potable water flow at the second heat exchanger, with the further pre-warmed potable water flow comprising a further pre-warmed potable water flow temperature higher than the pre-warmed potable water flow temperature, and directing 1412 the further pre-warmed potable water flow to the aircraft galley appliance water heater.

In another present aspect, in the method for decreasing electrical energy demand in an operating aircraft galley appliance water heater, the method further includes concurrently decreasing electrical energy demand in an operating air chiller.

In another present aspect, the potable water flow has an initial potable water flow temperature ranging from about 35° F. to about 77° F.

In a one present example, the further pre-warmed potable water flow at the second heat exchanger has a temperature ranging from about 110° F. to about 165° F. In another present example, the further pre-warmed potable water flow at the second heat exchanger has a temperature ranging from about 128° F. to about 166° F.

FIG. 190 is a flowchart outlining another present aspect, wherein a method 1500 comprises the elements presented and described in method 1400, and with the method 1500 further including directing 1502 a portion of the further pre-warmed potable water flow to a further pre-warmed potable water storage vessel.

FIG. 20 is a flowchart outlining another present aspect, wherein a method 1600 comprises the elements presented and described in method 1500, and with the method 1600 further including directing 1602 a portion of the further pre-warmed potable water flow from the further pre-warmed potable water storage vessel to the aircraft galley appliance water heater.

FIG. 21 is a flowchart outlining another present aspect, wherein a method 1700 comprises the elements presented and described in method 1400, and with method 1700 as shown in FIG. 21 further comprising directing 1702 a portion of the pre-warmed potable water flow back into the potable water supply from the pre-warmed potable water storage vessel, and with the potable water pathway configured to be a potable water open circuit.

According to another present aspect as shown in FIG. 22, a method 1800 for decreasing electrical energy demand in an operating aircraft galley appliance water heater and concurrently decreasing electrical energy demand in an operating aircraft air chiller is disclosed, with the method 1800 comprising directing 1802 a potable water flow from a potable water supply into a potable water pathway, with the potable water flow having an initial potable water flow temperature ranging from about 35° F. to about 77° F., and directing 1804 the potable water flow into a heat exchanger potable water inlet of a heat exchanger, with the heat exchanger positioned proximate to an air chiller unit (e.g., at the condenser inlet "side" of the air chiller unit), and with the heat exchanger comprising a heat exchanger warmer ambient air inlet and a heat exchanger cooler air outlet, and with the heat exchanger further comprising a heat exchanger potable water flow inlet and a heat exchanger pre-warmed potable water flow outlet. The method 1800 further comprises directing 1806 an ambient airflow into the heat exchanger warmer air inlet, with the ambient airflow having a temperature greater than the initial potable water flow temperature, and directing 1808 a cooler airflow from the heat exchanger cooler air outlet to the air chiller condenser intake, and with the cooler airflow having a temperature lower than the ambient airflow temperature. The method further comprises forming 1810 a pre-warmed potable water flow at the heat exchanger, with the pre-warmed potable water flow comprising a pre-warmed potable water flow temperature higher than the initial potable water flow temperature, and directing 1812 the pre-warmed potable water flow from the heat exchanger pre-warmed potable water flow outlet to the aircraft galley appliance water heater via a pre-warmed potable water flow line.

FIG. 23 is a flowchart outlining another present aspect, wherein a method 1900 comprises the elements presented and described in method 1800, and with method 1900 as shown in FIG. 23 further comprising directing 1902 a portion of the pre-warmed potable water flow to a pre-warmed potable water storage vessel.

FIG. 24 is a flowchart outlining another present aspect, wherein a method 2000 comprises the elements presented and described in method 1900, and with method 2000 as shown in FIG. 24 further comprising directing 2002 a portion of the pre-warmed potable water flow from the pre-warmed potable water storage vessel to the aircraft galley appliance water heater.

FIG. 25 is a flowchart outlining another present aspect, wherein a method 2100 comprises the elements presented and described in method 1900, and with method 2100 as shown in FIG. 25 further comprising directing 2102 a portion of the pre-warmed potable water flow back into the potable water supply, said potable water pathway configured to be a potable water open circuit.

The methods 1000, 1100, 1200, 1300, 1400, 1500, 1600, 1700 as shown in FIGS. 14, 15, 16, 17, 18, 19, 20, and 21 respectively, can incorporate one or more of the systems 100, 200, 300, 400, 500, 600 shown at least in FIGS. 4, 6, 7, 8, 9, 10, respectively, and described herein.

The methods 1800, 1900, 2000, and 2100 as shown in FIGS. 22, 23, 24, and 25, respectively, can incorporate one or more of the systems 700, 800, and 900 shown at least in FIGS. 11, 12, and 13, respectively, and described herein.

The systems, apparatuses, and methods described herein can further incorporate system controllers, sensors, detectors, thermostats, processors, alarms, shutoffs, additional valving, etc., and that can further include attendant processors, hardware and software, etc. to monitor, control, regulate, and/or alter one of more features of the cool potable water circuit and chilled air circuit either manually, automatically, remotely, etc. The addition of controllers, sensors, thermostats, actuators, alarms, "fail safes", etc., to the present systems can be in communication with readouts and/or can be in communication with automated electrical circuits to, for example, monitor and adjust temperatures of the air flow and temperatures of the potable water flow at one or more points along and throughout the air circuit and cool potable water circuit, including the temperature of the potable water supply, such that the air circuit and potable water circuit can be monitored in real time.

For example, if a temperature deviation from expected values arises and is detected, the configured and incorporated monitoring devices, and supporting software/hardware/processors can be configured to initiate actions on the water and air circuits to alter airflow and/or potable water flow velocities; change potable water circuit configurations from closed to open systems functioning, etc., for the purpose of, for example, returning a selected temperature range value to optimal operating temperatures, etc. Peripheral sensors, detectors, etc., can further include routine system "checks" on the components of the circuits (e.g., pump performance, system pressure, heat exchange performance, chiller performance, etc.) that can occur at scheduled maintenance intervals as well as occurring at throughout a flight, as a circuit cooling system is initiated, and further including a continuous cooling system monitoring in real time that can include leakage detection as well as temperature variation, etc.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed:

1. An onboard aircraft system for pre-warming a potable water flow to an aircraft galley water heating appliance, the onboard aircraft system comprising:

a potable water pathway comprising:

a potable water supply comprising a volume of potable water in a potable water supply vessel, said potable water supply comprising a potable water supply initial temperature;

a potable water flow line in communication with the potable water supply;

a chilled air circuit, said chilled air circuit comprising an air chiller unit, said air chiller unit comprising an air chiller condenser, said air chiller condenser comprising an air chiller condenser air intake;

a heat exchanger positioned proximate to the air chiller condenser intake, said heat exchanger in communication with the potable water flow line, said heat exchanger further in communication with the chilled air circuit, said heat exchanger comprising:

a heat exchanger potable water flow intake and a heat exchanger warmed potable water flow outlet;

a heat exchanger ambient air inlet and a heat exchanger cooled air outlet, said heat exchanger cooled air outlet positioned to deliver a cooled air flow from the heat exchanger to the air chiller condenser ambient air intake, said heat exchanger further configured to form a pre-warmed potable water flow;

a pre-warmed potable water flow line in direct communication with the heat exchanger potable water flow outlet;

an aircraft galley appliance comprising an aircraft galley appliance water heater, said aircraft galley appliance water heater in communication with the pre-warmed potable water flow line, said aircraft galley appliance water heater configured to further heat the pre-warmed potable water flow delivered to the aircraft galley appliance water heater via the pre-warmed potable water flow line; and a pre-warmed potable water storage vessel in communication with the pre-warmed potable water flow line, said pre-warmed potable water storage vessel further in communication with the aircraft galley appliance water heater.

2. The onboard aircraft system of claim 1, wherein the aircraft galley appliance is at least one of an aircraft galley coffee maker, an aircraft galley water boiler, and an aircraft galley steam oven.

3. The onboard aircraft system of claim 1, wherein, in operation, the potable water pathway is a potable water closed circuit, said potable water closed circuit further comprising a valve, said valve positioned between the aircraft potable water supply and the potable water pathway, and wherein said valve is configured to move from an open position configured to release potable water from the potable water supply into the potable water pathway to a closed position configured to restrict re-entry of the pre-warmed potable water flow back into the potable water supply.

4. The onboard aircraft system of claim 1, wherein, in operation, the potable water pathway is a potable water open circuit in communication with a continuous potable water flow directed from the aircraft potable water supply into the potable water circuit, and wherein a volume of the pre-warmed potable water flow downstream of at least one of the aircraft galley appliance and the pre-warmed potable water storage vessel is permitted to reenter the aircraft potable water supply.

5. The onboard aircraft system of claim 1, wherein, in operation, said pre-warmed potable water flow is configured to exit the heat exchanger warmed potable water flow outlet at a warmed potable water flow temperature ranging from about 60° F. to about 80° F.

6. The onboard aircraft system of claim 1, wherein the chilled air circuit is in communication with the potable water pathway.

7. The onboard aircraft system of claim 1, wherein the potable water pathway is at least in communication with the chilled air circuit at the heat exchanger, said potable water pathway configured to augment cooling in the chilled air circuit.

8. The onboard aircraft system of claim 1, wherein the pre-warmed potable water storage vessel is in communication with the potable water supply via the pre-warmed potable water flow line, said pre-warmed potable water flow line configured to direct a volume of pre-warmed potable water flow from the pre-warmed potable water storage vessel to the potable water supply.

9. An aircraft comprising the onboard aircraft system of claim 1.

10. An aircraft comprising the onboard aircraft system of claim 4.

11. An aircraft comprising the onboard aircraft system of claim 5.

12. A method for decreasing electrical energy demand in an operating aircraft galley appliance water heater, the method comprising:

providing the onboard aircraft system comprising:

a potable water pathway comprising:

a potable water supply comprising a volume of potable water in a potable water supply vessel, said potable water supply comprising a potable water supply initial temperature;

a potable water flow line in communication with the potable water supply;

a chilled air circuit, said chilled air circuit comprising an air chiller unit, said air chiller unit comprising an air chiller condenser, said air chiller condenser comprising an air chiller condenser air intake;

a heat exchanger positioned proximate to the air chiller condenser intake, said heat exchanger in communication with the potable water flow line, said heat exchanger further in communication with the chilled air circuit, said heat exchanger comprising:

a heat exchanger potable water flow intake and a heat exchanger warmed potable water flow outlet;

a heat exchanger ambient air inlet and a heat exchanger cooled air outlet, said heat exchanger cooled air outlet positioned to deliver a cooled air flow from the heat exchanger to the air chiller condenser ambient air intake, said heat exchanger further configured to form a pre-warmed potable water flow;

a pre-warmed potable water flow line in direct communication with the heat exchanger potable water flow outlet;

an aircraft galley appliance comprising an aircraft galley appliance water heater, said aircraft galley appliance water heater in communication with the pre-warmed potable water flow line, said aircraft galley appliance water heater configured to further heat the pre-warmed potable water flow delivered to the aircraft galley appliance water heater via the pre-warmed potable water flow line; and a pre-warmed potable water storage vessel in communication with the pre-warmed potable water flow line, said pre-warmed potable water storage vessel further in communication with the aircraft galley appliance water heater;

directing a potable water flow from the potable water supply into the potable water pathway, said potable water flow having an initial potable water flow temperature ranging from about 35° F. to about 77° F.;

directing the potable water flow into the heat exchanger potable water flow intake of the heat exchanger, said heat exchanger positioned proximate to the air chiller condenser in the chilled air circuit, said heat exchanger further comprising a heat exchanger warmer air inlet and a heat exchanger cooler air outlet, said heat exchanger further comprising a heat exchanger potable water flow inlet and a heat exchanger pre-warmed potable water flow outlet;

directing an ambient airflow into the heat exchanger warmer air inlet, said ambient airflow having a temperature greater than the initial potable water flow temperature;

directing a cooler airflow from the heat exchanger cooler air outlet to the air chiller condenser intake, said cooler airflow having a temperature lower than the ambient airflow;

forming the pre-warmed potable water flow at the heat exchanger, said pre-warmed potable water flow comprising a pre-warmed potable water flow temperature higher than the initial potable water flow temperature; and directing the pre-warmed potable water flow from the heat exchanger pre-warmed potable water flow outlet to the aircraft galley appliance water heater via the pre-warmed potable water flow line.

13. The method of claim 12, further comprising:

directing a portion of the pre-warmed potable water flow to the pre-warmed potable water storage vessel.

14. The method of claim 13, further comprising:

directing the portion of the pre-warmed potable water flow from the pre-warmed potable water storage vessel to the aircraft galley appliance water heater.

15. The method of claim 13, further comprising:

directing the portion of the pre-warmed potable water flow from the pre-warmed potable water storage vessel to the potable water supply.

16. The method of claim 13 further comprising:

directing the portion of the pre-warmed potable water flow from the potable water flow pathway into the potable water supply, said potable water pathway configured to be a potable water open circuit.

17. The method of claim 12, wherein the potable water pathway is in communication with the chilled air circuit, said potable water pathway configured to augment cooling in the chilled air circuit.

18. The method of claim 12, wherein, in operation, the potable water pathway comprises a potable water closed circuit.

19. The method of claim 12, wherein, in operation, the potable water pathway comprises a potable water open circuit, said potable water open circuit configured to remain in open communication with the potable water supply.

20. The method of claim 12, wherein the potable water supply maintains an average temperature ranging from about 35° F. to about 77° F. and the pre-warmed potable water flow leaving the heat exchanger in the potable water pathway comprises a pre-warmed potable water flow temperature ranging from about 60° F. to about 80° F.

* * * * *